(12) United States Patent
Ono et al.

(10) Patent No.: US 7,038,800 B2
(45) Date of Patent: May 2, 2006

(54) COMMUNICATION APPARATUS AND PROCESSING METHOD OF THE SAME

(75) Inventors: Yoshiyuki Ono, Kawasaki (JP); Naoji Fujino, Kawasaki (JP); Mitsuru Takahashi, Kawasaki (JP); Kimihide Ono, Kawasaki (JP); Norikatsu Tokairin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 834 days.

(21) Appl. No.: 09/855,289

(22) Filed: May 15, 2001

(65) Prior Publication Data

US 2002/0114017 A1   Aug. 22, 2002

(30) Foreign Application Priority Data

Dec. 22, 2000   (JP) ............................. 2000-390096

(51) Int. Cl.
*G06K 1/00* (2006.01)
*H04N 1/32* (2006.01)
*H04N 1/00* (2006.01)
*H04L 12/50* (2006.01)

(52) U.S. Cl. .................... 358/1.15; 358/468; 358/400; 370/359

(58) Field of Classification Search ............... 358/1.15, 358/400, 468; 370/359, 360, 465, 477, 496, 370/497
See application file for complete search history.

(56) References Cited

U.S. PATENT DOCUMENTS 6,249,531 B1 *   6/2001   Jacobi et al. ............... 370/477

* cited by examiner

*Primary Examiner*—Kimberly Williams
*Assistant Examiner*—Thomas J Lett
(74) *Attorney, Agent, or Firm*—Katten Muchin Rosenman LLP

(57) ABSTRACT

A communication apparatus for processing a fax signal and an audio signal includes an audio compression unit for compressing the audio signal, a fax-termination/switching control unit for terminating the fax signal and for executing control to prevent the fax signal from being compressed by the audio compression unit, a detection unit for detecting a predetermined negotiation signal used in a negotiation procedure for a fax communication from an input signal before compression within a fixed period of time starting at the beginning of the negotiation signal and an exclusion processing unit for carrying out an exclusion process on the negotiation signal upon detection of the negotiation signal.

9 Claims, 38 Drawing Sheets

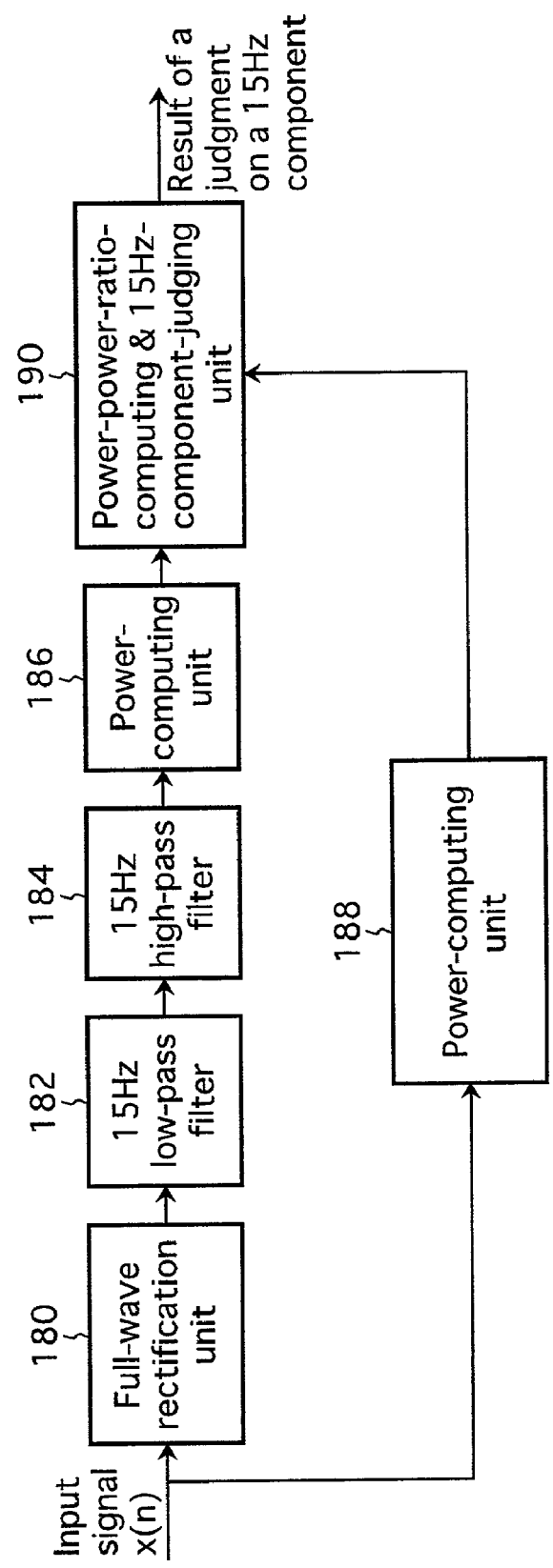
F I G. 19

Remove only
the 2100Hz component
from the input signal

The filter removes components of 2,100 ±15Hz
At that time, the 2100Hz component and
components of ±15Hz relative to 2100Hz are
removed.

A newly created 2100Hz component
(2100Hz single tone) is inserted.
The 2100Hz single tone does not include ±15Hz
components (or is not amplitude-modulated at 15Hz)

COMMUNICATION APPARATUS AND PROCESSING METHOD OF THE SAME

BACKGROUND OF THE INVENTION

1. Field of the Invention

The present invention relates to a communication apparatus capable of interfacing with fax and audio signals and relates to a processing method adopted by the apparatus.

2. Description of the Related Art

In recent years, the amount of data communication traffic has been displaying an increasing trend while the amount of audio communication traffic has been showing a decreasing trend among various kinds of traffic in a network. In a number of networks, the amount of data communication traffic already exceeds the amount of audio communication traffic. In the future, it can be said that the amount of data communication traffic will further display an increasing trend and a fraction occupied by audio communication will show a decreasing trend. Since real-time conditions are not required for data communication, however, the band is allowed to change dynamically. On the other hand, audio communication requires that real-time conditions be met. Thus, a fixed band must be allocated. During an audio communication, the allocated fixed band is completely occupied. Thus, audio communication always consuming a fixed band even in a mute state, and consumption of a fixed band in a mute state is not desirable if seen from a standpoint of network utilization efficiency. Therefore, it is necessary for a communication apparatus in a communication network to compress voices and sounds, to reduce the size of a band allocated to the voices and sounds and thus to increase a multiplexing rate of the voices and sounds due to the compression and the down sizing in order to raise a communication efficiency and, hence, reduce the communication cost. Since real-time conditions are not required for data communication as described above, on the other hand, a band allocated to data can be dynamically changed in a general communication of the data in accordance with factors such as the amount of data traffic and priority.

A fax communication can be normally carried out by allowing the fax communication to share a telephone network with telephone communications. Thus, when a method of compressing an audio band in a communication network is adopted, the compressed band is supposed to be usable for a fax communication. Since a coding & decompression algorithm adopted in an audio compression/decompression functional unit for compressing and decompressing human voices is set specially for human voices, however, the compression & decompression mechanism is not applicable to fax communication. Thus, a fax communication must be carried out without using the audio compression/decompression functional unit. In order to implement such fax communication, a fax termination function is required. To put it concretely, a fax termination unit of a communication apparatus and a fax terminal connected to the fax termination unit serves as a receiver and a transmitter respectively in a fax communication. That is to say, the fax terminal on the transmission side carries out a fax termination with the reception-side fax termination unit connected to the fax terminal. In such a fax communication, the fax termination unit of the communication apparatus actually relays the communication so that the fax terminal appears to have a fax communication with the fax termination unit to the bitter end.

A communication apparatus handling voices, sounds and data has a data-communication interface and an audio-line interface, which allow interfacing with both an audio line and a data communication line. Such a communication apparatus supports communications such as VTOA (Voice Over ATM), VOIP (Voice Over IP) and VOFR (Voice Over Frame Relay). The VTOA is communication through an ATM network by accommodation of an audio signal in an ATM cell. The VOIP is communication through an IP network by accommodation of an audio signal in an IP packet. The VOFR is communication through a frame-relay network by accommodation of an audio signal in a frame-relay signal. The audio-line interface must support voice communication and fax communication like the conventional audio line as described above. In order to reduce the audio band by as much as possible, however, an audio compression/decompression functional unit in an audio interface unit employed in an audio-line processing unit decreases the size of the audio band and compresses a voice or a sound before transmitting the voice or the sound through a relay line. Nevertheless, this compression & decompression algorithm is designed specially for human voices.

For this reason, even if compression and decompression are carried out on a human voice, the human voice does not deteriorate much and the quality of the voice does not become poor. If compression and decompression are carried out on a signal other than a human voice by adopting the above algorithm, however, the signal will deteriorate substantially. Thus, when a fax signal passes through an audio compression/decompression functional unit, the signal deteriorates substantially. When the fax signal reaches a fax terminal on the receiver side, the signal has become a signal that cannot be recognized by the fax terminal as a fax signal. Thus, since a fax signal must not be passed through an audio compression/decompression functional unit, an audio-line processing unit is provided with a fax termination switching device in addition to the audio compression/decompression functional unit. If the input signal is an audio signal, the input signal is supplied to the audio compression/decompression functional unit. If the input signal is a fax signal, on the other hand, the input signal is supplied to the fax termination switching device instead of the audio compression/decompression functional unit. In this way, a fax signal can be received correctly without carrying out processing designed for a human voice.

In addition, when an analog fax signal passes through a digital network, a delay caused by the network may become a problem. In the case of fax communication through an analog telephone line, the fax machine on the transmitting side is perfectly connected to the fax machine on the receiving side by a telephone line. Thus, a fax communication can be carried out without causing a problem in particular. If the fax signal must pass through a digital network between telephone lines, however, a delay is introduced. Such a delay is caused by data processing such as analog-to-digital conversion, digital-to-analog conversion, packetization and depacketization. In a fax terminal, a delay is not assumed to exist. Thus, when an expected signal is not received within a fixed period of time, the fax terminal enters a time-out state, making a fax communication impossible in some cases. In order to solve this problem, a fax termination unit mounted on an audio communication line processing unit employed in a communication apparatus connected to the fax terminal pretends to function as a partner fax terminal. In this way, a time-out state can be avoided. The fax termination units exchange data through the digital network. Fax data is transmitted to the fax termination unit on the communication-partner side and then forwarded to a fax terminal connected to the fax termination unit. Thus, an end-to-end communication can be carried out between fax terminals.

In order to carry out a fax communication through an audio communication line of an ATM communication network, an IP communication network or another digital communication network by using the VTOA, the VOIP, the VOFR or the like, it is necessary to provide a fax termination unit in the communication apparatus. In the case of the VOIP, it is necessary to provide a mechanism conforming to T.38 specifications if a fax termination unit is not used. In a normal case, an analog fax communication through a PSTN line is generally carried out at a speed of 14,400 bps in accordance with a procedure conforming to T.30 specifications. This fax communication is referred to as an old G3 fax communication. In the year of 1996, Annex F is added to the T.30 specifications to allow a communication to be carried out at a high speed of typically 33,600 bps by using a modem in accordance with V.8, V.34 or the like. In this way, a technique of carrying out a fax communication at a higher speed is set as a standard. The number of fax terminals conforming to this standard increases. Fax communication conforming to this standard is called super G3 fax. To be more specific, the super G3 fax communication is fax communication carried out at a speed of close to 33,600 kbps using V.34 after a preceding negotiation between terminals using a V.8-recommendation signal having a speed of 300 bps. With the advent of the super G3 fax terminal capable of carrying out a fax communication at a high speed, it is possible to replace the G3 fax terminal becoming obsolete, as far as fax communication is concerned, with such a super G3 fax terminal without changing the configuration and operation conditions of the conventional communication network.

If the G3 fax terminal becoming obsolete, as far as fax communication is concerned, is replaced by such a super G3 fax terminal, however, the following problems rise. When a super G3 fax terminal with a broad band such as 33,600 kbps is connected to a communication apparatus employing the conventional G3 fax termination unit, the G3 fax termination unit is not capable of understanding the V.8 recommendation in a first negotiation with the super G3 fax terminal. Thus, the G3 fax termination unit does not recognize a negotiation signal as a fax signal, remaining in an inoperative state. As a result, the communication apparatus is not switched to the G3 fax termination unit. Much like an ordinary audio signal, a negotiation signal output by a super G3 fax terminal is transmitted through an audio compression/decompression functional unit. In a fax communication between super G3 fax terminals, a negotiation using a V.8-recommendation signal is carried out at a low rate of 300 bps.

As described above, an audio compression/decompression functional unit carries out processing specially provided for voices or sounds so that, when a fax signal passes through the audio compression/decompression functional unit, a fax terminal is not capable of carrying out a communication. Even if a signal having a low rate of 300 bps prescribed by the V.8 recommendation passes through the audio compression/decompression functional unit and is subjected to the processing specially provided for voices or sounds, however, a fax terminal on the communication-partner side will be capable of recognizing the signal as a V.8 signal in some cases. This is because the signal is transmitted at a low rate of 300 bps. Thus, a V.8-recommendation signal used as a negotiation signal of a super G3 fax terminal is transmitted successfully to a fax terminal on the communication-partner side by way of an audio compression/decompression functional unit so that a negotiation between fax terminals each serving as a super G3 fax terminal can be completed normally. Thus, the fax terminals each serving as a super G3 fax terminal are capable of starting a communication between them. Thereafter, the super G3 fax terminals make an attempt to establish a communication at 33,600 bps in accordance with the V.34 recommendation set for the super G3 fax communication. At the speed of 33,600 bps, however, a communication cannot be continued normally due to an overflow over a band allocated to compression of a signal transmitted at a speed of 8 kbps, 16 kbps or the like. In addition, since the fax termination unit is not capable of understanding a super G3 fax signal, the communication apparatus serving as the communication partner is not switched to the fax termination unit. Thus, since the fax signal passes through the audio compression/decompression functional unit, processing customized for voices or sounds is additionally carried out on the fax signal. As a result, the fax communication between the super G3 fax terminals is certainly lost.

In addition, in a communication according to the V.34-recommendation procedure, an ordinary fax termination unit is capable of understanding a transmitted signal but there is no means for handing over the communication to a G3 Fax-communication procedure capable of switching the communication to a fax communication in accordance with the recommendation. Thus, there is no method except a technique for cutting off the fax communication. For this reason, if a super G3 fax terminal is connected to a communication apparatus, the super G3 fax terminal needs to be set to carry out G3 fax communications instead of super G3 fax communications. Once the calling super G3 fax terminal merely receives an ANSam signal transmitted at the beginning of a negotiation according to the V.8 recommendation for super G3 fax terminals, however, the communication completely transits to the super G3 fax procedure and there is no means for returning the communication to the ordinary G3 fax communication procedure. Thus, at the time of a first negotiation between super G3 fax terminals, it is already impossible to carry out an ordinary G3 fax communication. It should be noted that an ANSam signal is a signal with a frequency of 2,100 Hz and phase inversions at intervals of 450 ms. The signal completes amplitude modulation at a frequency of 15 Hz.

In addition, in the case of a mechanism for implementing real-time fax communication in a VOIP network, that is, a mechanism prescribed in the T.38 specifications wherein an audio signal and a fax signal are accommodated in a packet with a fixed frame length and transmitted by using a fixed band, in an attempt made to carry out a super G3 fax communication by connecting a super G3 fax terminal, the super G3 fax communication will end in a failure since, at the present time, T.38 is not compatible with the super G3 fax communication.

SUMMARY OF THE INVENTION

It is therefore an object of the present invention addressing the problems described above to provide a communication apparatus capable of carrying out fax communications through a connected super G3 fax terminal without entailing a large-scale change such as a change in hardware, that is, by merely implementing a minimum change incurring no cost.

In accordance with an aspect of the present invention, there is provided a communication apparatus comprising an audio compression unit for compressing an audio signal and outputting the compressed signal as an audio coded signal, and a fax-termination/switching control unit which carries out termination processing on a fax signal and controls a switch to output of said audio compression but the fax signal completing the termination processing when the fax signal is detected. The communication apparatus is characterized in that the apparatus further has an exclusion processing unit which is provided in front of the audio compression unit and blocks transmission of a raw negotiation signal to the audio compression unit in an exclusion process when detecting the negotiation signal.

It is desirable to implement a configuration of the exclusion processing unit wherein only a signal component with a frequency of the negotiation signal is removed from an input signal and components with other frequencies are passed on. It is desirable to further provide a single-tone-generating unit for generating a single tone with a fixed frequency indicating a fax terminal upon detection of the negotiation signal, and a synthesis unit for adding the single tone to a signal completing an exclusion process carried out in the exclusion processing unit.

The above and other objects, features and advantages of the present invention as well as the manner of realizing them will become more apparent whereas the invention itself will best understood from a careful study of the following description and appended claims with reference to attached drawings showing some preferred embodiments of the invention.

BRIEF DESCRIPTION OF THE DRAWINGS

FIG. 19 is a diagram showing the configuration of a 15 Hz-signal-component detecting unit employed in the ANSam-detecting functional unit shown in FIG. 16;

DETAILED DESCRIPTION OF THE PREFERRED EMBODIMENTS

Figure 1:
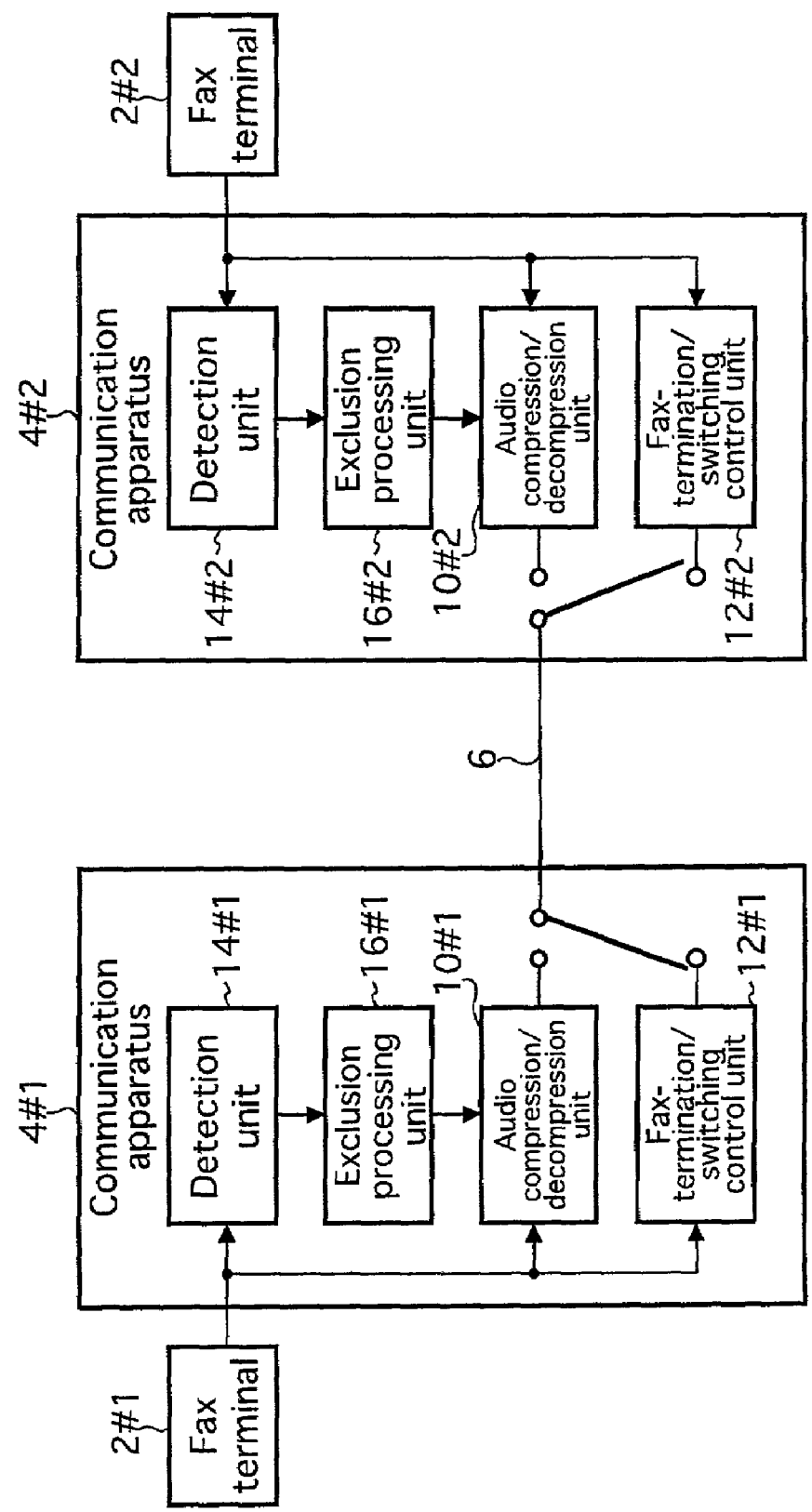
FIG. 1 is a diagram showing the principle of the present invention.
Figure 2:
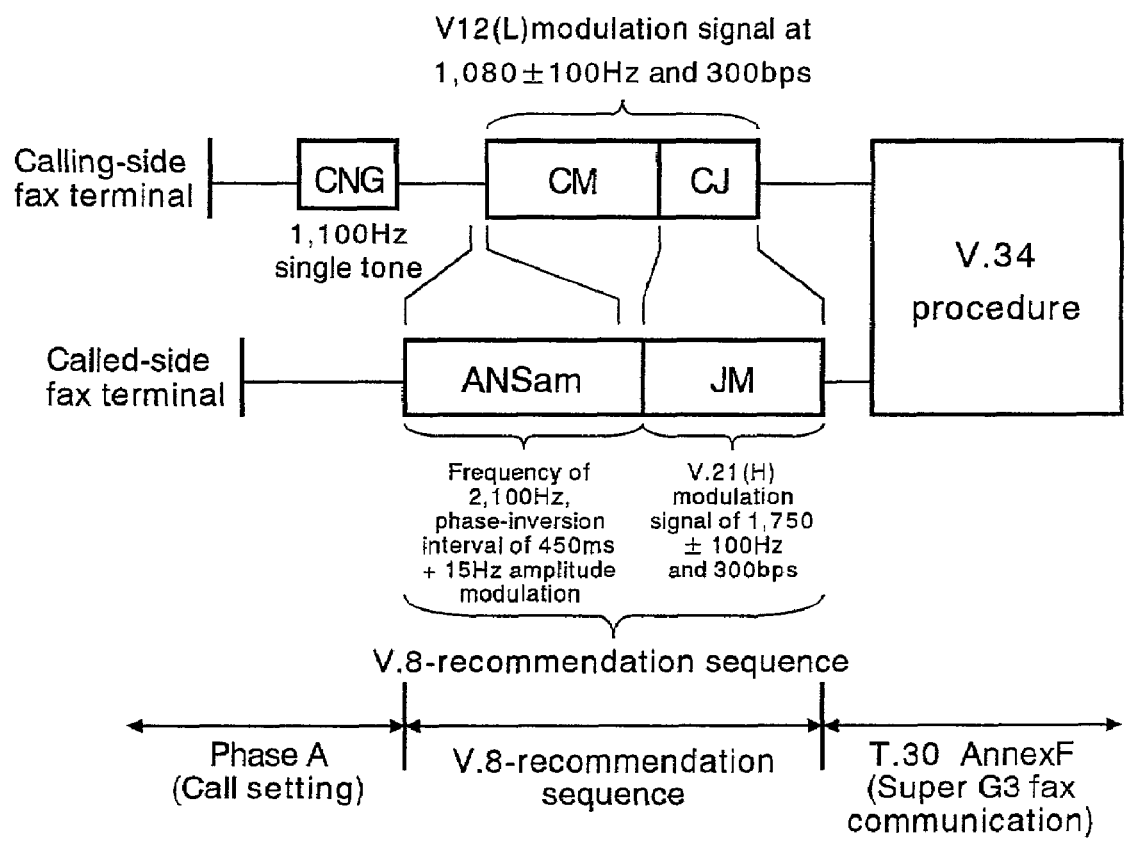
FIG. 2 is a diagram showing a sequence of a super G3 fax negotiation.

Prior to explanation of preferred embodiments provided by the present invention, the principle of the invention is described. FIG. 1 is a diagram showing the principle of the present invention. To begin with, a super G3 fax negotiation is explained. FIG. 2 is a diagram showing a sequence of a super G3 fax negotiation. As shown in FIG. 2, first of all, a calling-side terminal, that is, a terminal on the call generation side, transmits a CNG signal or a 1100 Hz single tone, which is a signal indicating that the calling-side terminal is a fax terminal. It is not necessary for the called-side terminal to detect the signal. Then, a V.8-recommendation sequence is started. The V.8-recommendation sequence is a procedure specific to the super G3 fax communication. The procedure begins with a transmission of an ANSam signal by the fax terminal on the called side to the calling-side terminal. The calling-side terminal receives and detects the signal which informs the calling-side terminal that the fax terminal on the called side is a terminal supporting the super G3 fax communication. Informed of the fact that the fax terminal on the called side is a terminal supporting the super G3 fax communication, the fax terminal on the calling side transmits a CM signal with a frequency of 1,080 Hz±100 Hz at a speed of 300 bps to the fax terminal on the called side. The CM signal is a signal completing frequency modulation based on binary codes comprising Boolean values of 0 and 1 in accordance with a V.21 recommendation. The binary codes indicate information such as a usable transmission speed and a usable transmission procedure, which are necessary for carrying out a super G3 fax communication. To put it in detail, a binary code of 0 is transmitted as a single tone having a frequency of 980 Hz whereas a binary code of 1 is transmitted as a single tone having a frequency of 1,180 Hz. When the transmission of the CM signal is ended, the fax terminal on the calling side transmits a CJ signal indicating the end of the CM-signal transmission. Much like the CM signal, the CJ signal is a signal completing frequency modulation based on binary codes in accordance with the V.21 recommendation.

Receiving the CM signal from the fax terminal on the calling side, the fax terminal on the called side analyzes information conveyed by the CM signal. Then, the fax terminal on the called side transmits a JM signal with a frequency of 1,750 Hz±100 Hz at a speed of 300 bps to the fax terminal on the called side. The CM signal is a signal completing frequency modulation based on binary codes comprising Boolean values of 0 and 1 in accordance with the V.21 recommendation. The binary codes indicate information on the fax terminal on the called side such as information on whether the called-side is capable of communicating at a speed specified by the fax terminal on the calling side or another speed, each of which is necessary for carrying out a super G3 fax communication. To put it in detail, a binary code of 0 is transmitted as a single tone having a frequency of 1,650 Hz whereas a binary code of 1 is transmitted as a single tone having a frequency of 1,850 Hz.

When the negotiation based on the V.8 recommendation is completed, the flow of the sequence enters a V.34-recommendation procedure, in accordance with which data is transmitted in a super G3 fax communication. When the fax terminal on the calling side receives an ANSam signal during this negotiation, the fax terminal on the calling side completely transits to the super G3 fax procedure and does not return to the ordinary G3 fax communication. If the fax terminal on the called side does not receive an ANSam signal, the communication is carried out in accordance with the ordinary G3 fax procedure instead of the super G3 fax procedure.

Figure 3:
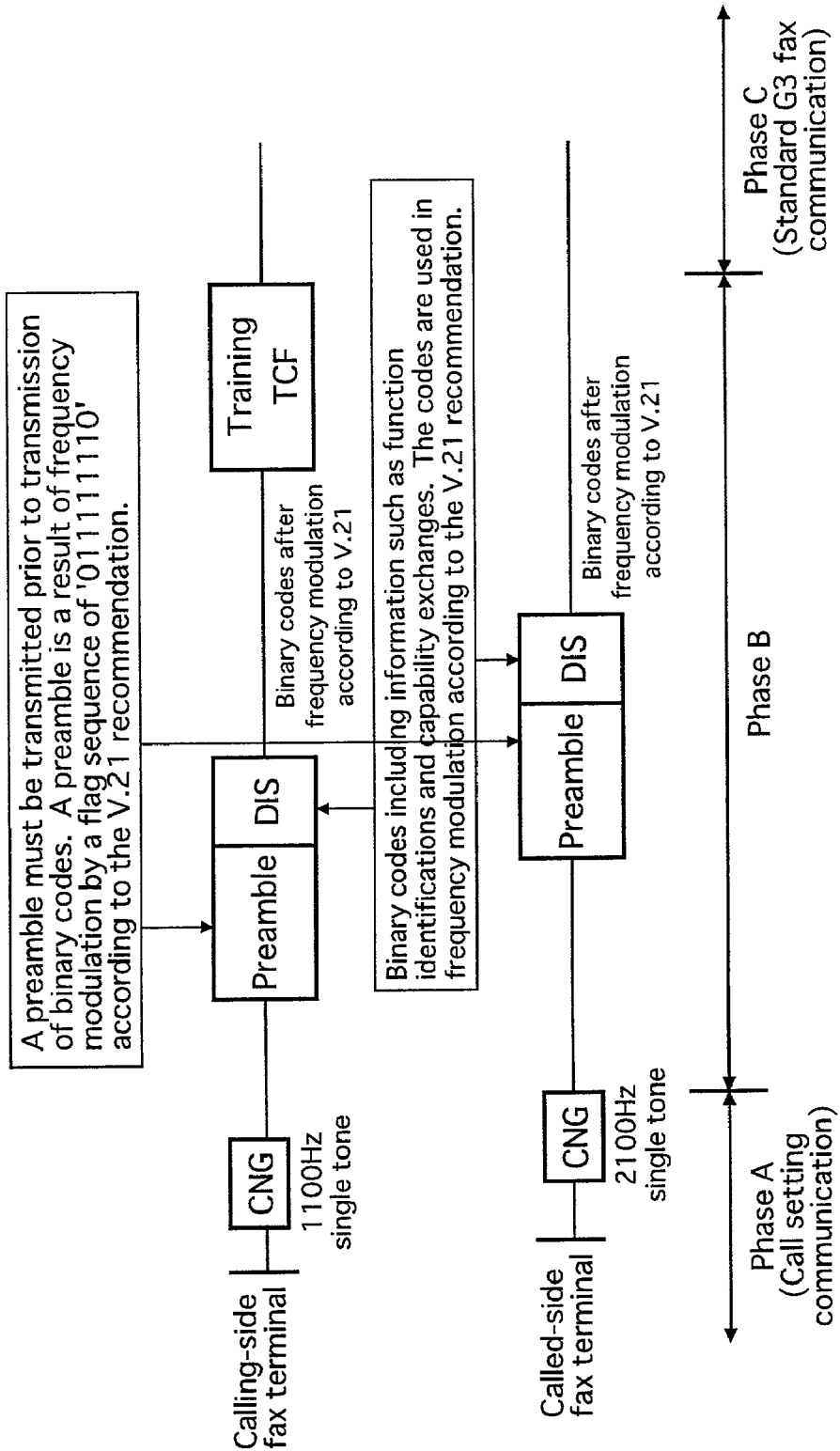
FIG. 3 is a diagram showing a sequence of a standard G3 fax communication.

FIG. 3 is a diagram showing a sequence of a standard G3 fax communication. As shown in FIG. 3, in the standard G3 fax communication, the sequence proceeds from phase A to phase C through phase B. Phase A is a phase showing call setting. Phase B is a phase at which various kinds of information for the standard G3 fax communication are exchanged. Phase C is a phase of the actual communication. The fax terminal on the calling side transmits a CNG tone indicating that the fax terminal on the calling side is a fax terminal. It is not necessary for the fax terminal on the called side to detect the CNG tone. By the same token, the fax terminal on the called side transmits a CED tone indicating that the fax terminal on the called side is a fax terminal, and it is not necessary for the fax terminal on the calling side to detect the CED tone. As the flow of the sequence enters phase B at the end of the call-setting phase, binary codes having Boolean values of 0 and 1 are exchanged through signals completing frequency modulation based on the binary codes in accordance with the V.21 recommendation instead of the CNG and CED tones exchanged at phase A.

After the preparation of the fax communication is done, the flow of the sequence enters phase C for a communication of actual data. It should be noted that, in the standard G3 fax communication, a preamble always precedes a binary code. A preamble is obtained as a result of frequency modulation based on a flag sequence of '011111110' in accordance with the V.21 recommendation. In the case of the super G3 fax communication described earlier, phase A is the same as the G3 fax communication shown in FIG. 3. Then, in the case of the standard G3 fax communication, the sequence enters phase B but, in the case of the super G3 fax communication, the flow enters an initial sequence according to the V.8 recommendation between phases A and B. If the fax terminal on the communication-partner side is found to be a G3 fax terminal in this initial sequence according to the V.8 recommendation or a request for a G3 fax communication is made during this V.8-recommendation sequence, the super G3 fax terminal transits to phase B of the standard G3 fax communication shown in FIG. 11 at the end of the V.8-recommendation sequence. Then, the standard G3 fax communication is carried out. If a negotiation of the super G3 fax communication is concluded in the V.8-recommendation sequence, the flow enters Annex FV.34 (T.30 Annex F) as it is to implement the super G3 fax communication.

The super G3 fax communication is prescribed from the beginning to be compatible with the ordinary G3 fax communication having a speed of 14,400 bps or lower. That is to say, when the terminal on the communication-partner side is recognized to be an ordinary G3 fax terminal, a communication is carried out only in the ordinary G3 fax mode. To put it concretely, if the fax terminal on the calling side does not receive an ANSam signal after making a call and the fax terminal on the called side does not detect a CM signal, a transition to the standard G3 mode (phase B) takes place. The ANSam signal is the first signal in the V.8-signal sequence after the call. At that time, both the fax terminal must not transit to the standard G3 mode. If the fax terminal on the called side transits to the standard G3 mode without detecting a CM signal in spite of the fact that the fax terminal on the calling side receives an ANSam signal, entering the super G3 mode (T.30 Annex F), it is quite within the bounds of possibility that the communication is disconnected since the operation carried out at that time is not prescribed in the recommendation. The V.8 signal cited above cannot be recognized as a fax signal by a communication apparatus having an ordinary G3 fax terminal. Thus, the V.8 signal is exchanged in an audio mode without switching the communication to the fax termination unit as is the case with the ordinary audio signal. In addition, in the audio mode, even if the signal passes through the audio compression/decompression unit, the V.8-recommendation negotiation will be completed and the super G3 fax communication (T.30 Annex F) will be started. When the super G3 fax communication is started, the negotiation is ended and the phase to exchange data is commenced. At that time, the super G3 fax communication is disconnected for the following two reasons. In the first place, a signal passing through the audio compression/decompression unit will deteriorate. In the second place, the fax communication will take place with the fax termination function not operating as it is.

In order to avoid such circumstances, there are provided two methods. In accordance with one of the methods, an additional circuit implementing the fax termination unit is provided for supporting the super G3 fax function so as to detect the super G3 fax negotiation and switch the communication to the fax mode. In the other method, when the super G3 fax terminal is connected, a communication is established as a standard G3 fax communication without carrying out a super G3 fax communication by supplementation to the signal. Since a new fax termination for supporting the super G3 fax function is added in accordance with the first method, a change in circuit needs to be made to the conventional communication apparatus. Thus, a vary-large-scale modification is entailed, raising the cost. In addition, it takes time and labor to redesign the circuit. While much time and labor are required to implement the method, a fax communication can be carried out only in a band used as an audio band. Thus, in a communication apparatus having an audio compression/decompression unit and a fax termination unit, it is impossible to carry out a communication at a high speed of 33,600 bps to implement the super G3 fax features even if a new fax termination for supporting the super G3 fax function is added. That is to say, it is possible to carry out a fax communication only at a speed in a band allocated to audio signals. Assume for example that an 8-kbps band is allocated to audio signals and the audio compression/decompression unit thus compresses an audio signal to 8 kbps, assigning the signal to the audio band. In this case, a fax communication is no more than a communication not exceeding 8 kbps, and such a communication is entirely the same as the ordinary G3 fax communication.

In the case of a communication apparatus handling audio signals and data at the same time in a band allocated as a fixed band to audio communications, it is just natural to make an effort to efficiently use the band by compression of the signals and data. If an audio compression/decompression unit is used, audio signals can be assigned only to a band of the order of 16 kbps or 8 kbps in many cases. As a result, the achievable maximum speed is about 14.4 kbps, which is the speed of the ordinary G3 fax communication, even if a super G3 fax terminal for carrying out fax communications at a high speed by using a 33.6-kbps band is connected. Thus, the speed is entirely the same as the ordinary G3 fax. In such a circumstance, a circuit of the communication apparatus can be changed in order to make the fax termination unit capable of supporting the super G3 fax communication. Considering the cost as well as the labor and the time for making such a change, however, such a change is not worth making since it does not give a result commensurate with the cost, the time and the labor. In order to solve this problem, proper processing is carried out in a unit for inputting and outputting an audio signal so as not to let the fax terminal on the calling side receive the V.8-recommendation ANSam signal and let the super G3 fax terminal carry out a fax communication according to the ordinary G3 fax procedure. As a result, a simple and cost-effective method can be adapted to fax communications wherein a super G3 fax terminal is connected to a communication apparatus.

In order to make a transition from a communication conforming to a super G3 fax recommendation to an ordinary G3 fax communication, there are a method of blocking an ANSam signal and a method of blocking a V.21 signal such as a CM signal. However, while the fax terminal on the calling side enters the super G3 fax mode on reception of an ANSam signal, the fax terminal on the called side carries out ordinary G3 communications because a V.21 signal such as a CM signal is not received. The recommendation does not include a method to go back to a standard G3 communication (phase B) after only the calling-mode fax terminal switches to the super G3 fax mode as such. For this reason, in the method of blocking a V.21 signal such as a CM signal, the operation is not prescribed by the recommendation and it is thus quite within the bounds of possibility that, if the worse comes to the worst, the communication is disconnected. The most reliable technique is a method of blocking the ANSam signal which is the first signal in the V.8 sequence. In accordance with this method, the communication apparatus on the called side blocks an ANSam signal transmitted by the super G3 fax terminal.

The principle of the present invention is explained as follows. As shown in FIG. 1, the network system comprises fax terminals 2#i where i=1 and 2, communication apparatuses 4#i where i=1 and 2 and a relay network 6. The communication apparatus 4#i comprises an audio compression/decompression unit 10#i, a fax-terminal/switching control unit 12#i, a detection unit 14#i and an exclusion processing unit 16#i. The fax terminals 2#i where i=1 and 2 are each a super G3 fax terminal. Let the fax terminal 2#1 be a fax terminal on the calling side whereas the fax terminal 2#2 be a fax terminal on the called side. Assume that the fax terminal 2#1 is put in an on-hook state and a number is dialed to the fax terminal 2#2. In this case, the fax terminal 2#2 transmits an ANSam signal to the fax terminal 2#1. The ANSam signal is one of negotiation signals for the super G3 fax communication. The detection unit 14#2 employed in the communication apparatus 4#2 detects the ANSam signal. The exclusion processing unit 16#2 carries out an exclusion process on the ANSam signal. The audio compression/decompression unit 10#2 then compresses the ANSam signal completing the exclusion process. Then, the compressed signal is transmitted to the communication apparatus 4#1 through the relay network 6. The audio compression/decompression unit 10#1 employed in the communication apparatus 4#1 decompresses the signal and supplies the decompressed signal to the fax terminal 2#1. Since the ANSam signal is a signal completing an exclusion process, the fax terminal 2#1 does not accept the signal but typically enters a negotiation sequence of the G3 fax communication instead. In this way, a G3 fax communication can be established between the fax terminal 2#1 and the fax terminal 2#2. The same holds true of a reversed case in which the fax terminal 2#1 serves as a fax terminal on the called side and the fax terminal 2#2 serves as a fax terminal on the calling side. In this case, since an ANSam signal transmitted by the fax terminal 2#1 is subjected to an exclusion process in the exclusion processing unit 16#1, a G3 fax communication can be established between the fax terminal 2#1 and the fax terminal 2#2 as well.

The present invention can be applied to an audio processing apparatus having a compression & decompression function for compressing and decompressing received data and a fax-termination & switching control function used for terminating a G3 fax communication and for controlling switching operations. The present invention is also applicable to a communication apparatus employing such an audio processing apparatus and a network system including such a communication apparatus.

Figure 4:
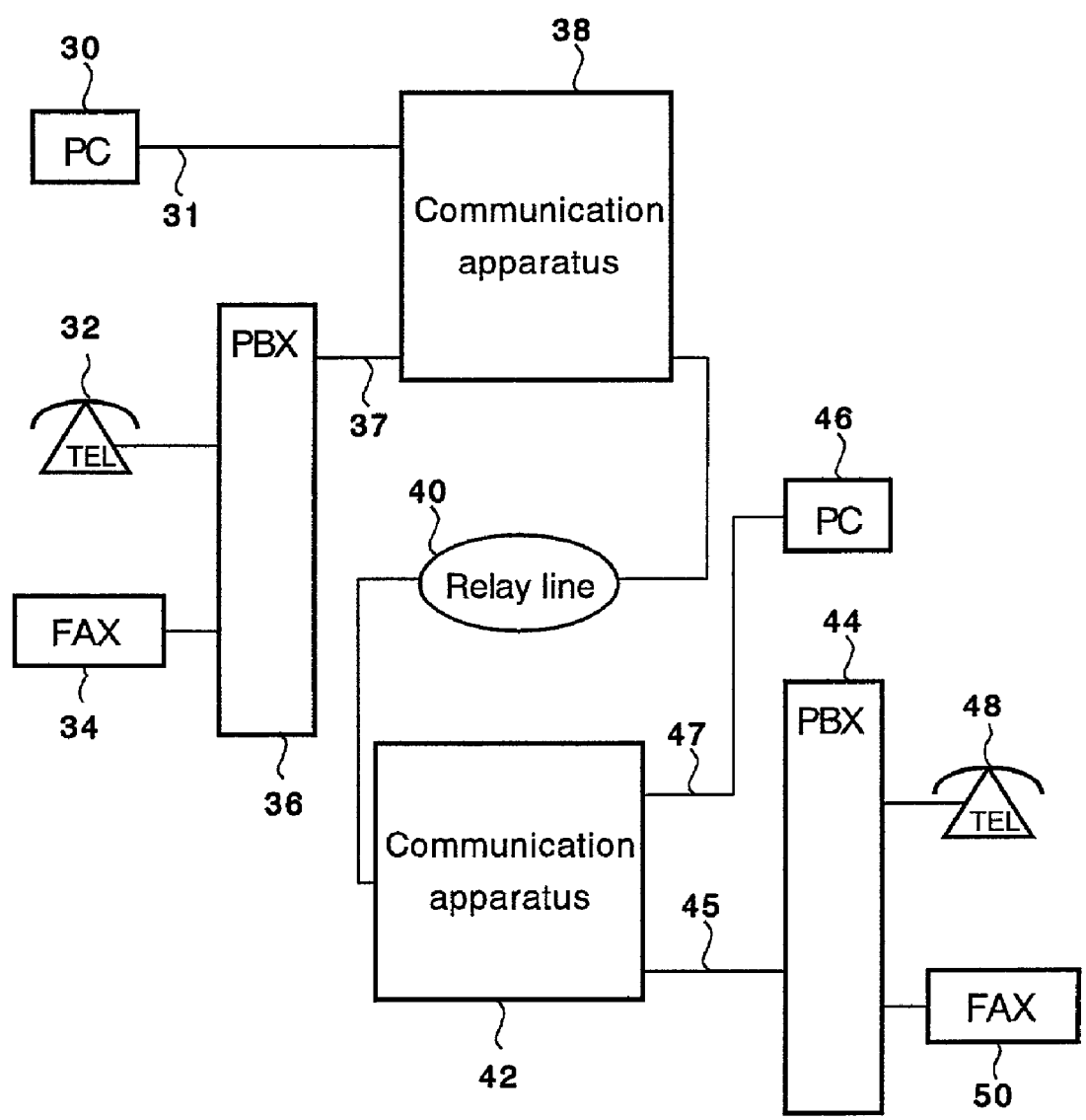
FIG. 4 is a diagram showing the configuration of a typical network system to which the present invention can be applied.

The following description explains a typical network system to which the present apparatus can be applied. FIG. 4 is a diagram showing the configuration of a typical network system to which the present invention can be applied. To be more specific, FIG. 4 shows a network system for receiving audio data to be transferred through a data network. As shown in FIG. 4, the network system comprises terminals such as personal computers 30 and 46, telephone sets 32 and 48 and fax machines 34 and 50, exchanges such as PBXes 36 and 44, communication apparatuses 38 and 42 and a relay line 40. The personal computers 30 and 46 are each referred to hereafter as a PC. The telephone sets 32 and 48 are each an analog phone set. The fax machines 34 and 50 are each a super G3 fax terminal or a G3 fax terminal. The PBXes 36 and 44 are each an exchange for handling audio data of the telephone sets 32 and 48 as well as the fax machines 34 and 50.

The communication apparatus 38 accommodates a data network 31 for transmitting PC data from the PC 30 and an audio network 37 for transmitting audio data from the PBX 36, passing on the PC data and the audio data to the relay line 40. By the same token, the communication apparatus 42 accommodates a data network 47 for transmitting PC data from the PC 46 and an audio network 45 for transmitting audio data from the PBX 44, passing on the PC data and the audio data to the relay line 40. The communication apparatuses 38 and 42 have audio processing units for accommodating the audio networks 37 and 45 respectively. Such audio processing units are each referred to hereafter as an audio interface card. In order to improve the network efficiency, the audio interface card is provided with an audio compression/decompression functional unit and a fax-termination/switching control unit. Audio data is compressed into data of typically 16 kbps or 8 kbps by adoption of an ADPCM technique or the like. The relay line 40 is a digital network serving as a relay between the communication apparatuses 38 and 42. In the above configuration, data transmitted by the PC 30 by way of the data network 31 is received by the communication apparatus 38. The data is then transmitted to the PC 46 on the communication-partner side by way of the relay line 40, the communication apparatus 42 and the data network 47. By the same token, audio data transmitted by the set 32 and the fax machines 34 by way of the PBX 44 and the audio network 37 is received by the communication apparatus 38. The audio compression/decompression functional unit employed in the communication apparatus 38 then transmits the audio data to the communication apparatus 42 through the relay line 40. Then, the audio compression/decompression functional unit employed in the communication apparatus 42 transmits the audio data to the telephone set 48 through the audio network 45 and the PBX 44. In the same way, fax data transmitted by the machine 34 by way of the PBX 36 and the audio network 37 is received by the communication apparatus 38. The audio fax-termination/switching control unit employed in the communication apparatus 38 then transmits the fax data to the communication apparatus 42 by the relay line 40. Then, the fax-termination/switch control unit employed in the communication apparatus 42 transmits the fax data to the fax machine 50 through the audio network 45 and the PBX 44.

As described above, the communication apparatus 38 receives PC data from the data network 31 and audio data from the audio network 37, outputting the data to the relay line 40. Likewise, the communication apparatus 42 receives PC data from the data network 47 and audio data from the audio network 45, outputting the data to the relay line 40. The relay line 40 is a digital network capable of receiving audio data from the audio networks 37 and 45 and PC data from the data networks 31 and 47. There are some patterns of network like a network for processing PC data and audio data at the same time. These patterns are called VTOA, VOFR, VOIP and the like which are technologies each used for transmitting PC data and audio data using an ATM, frame-relay or IP network. The relay line 40 can be an ATM, frame-relay or IP network. There are a variety of possible network implementations for taking in audio data to these ATM, frame-relay and IP networks. In the case of the VOIP technology, a router is provided with a function required for an audio network and a function for putting audio in IP packets. An example of the function required for an audio network is the audio compression/decompression function and the fax termination unit. There are also other various implementations including a method of receiving PC data and audio data on the PBX side. A typical example is explained as follows.

Figure 5:
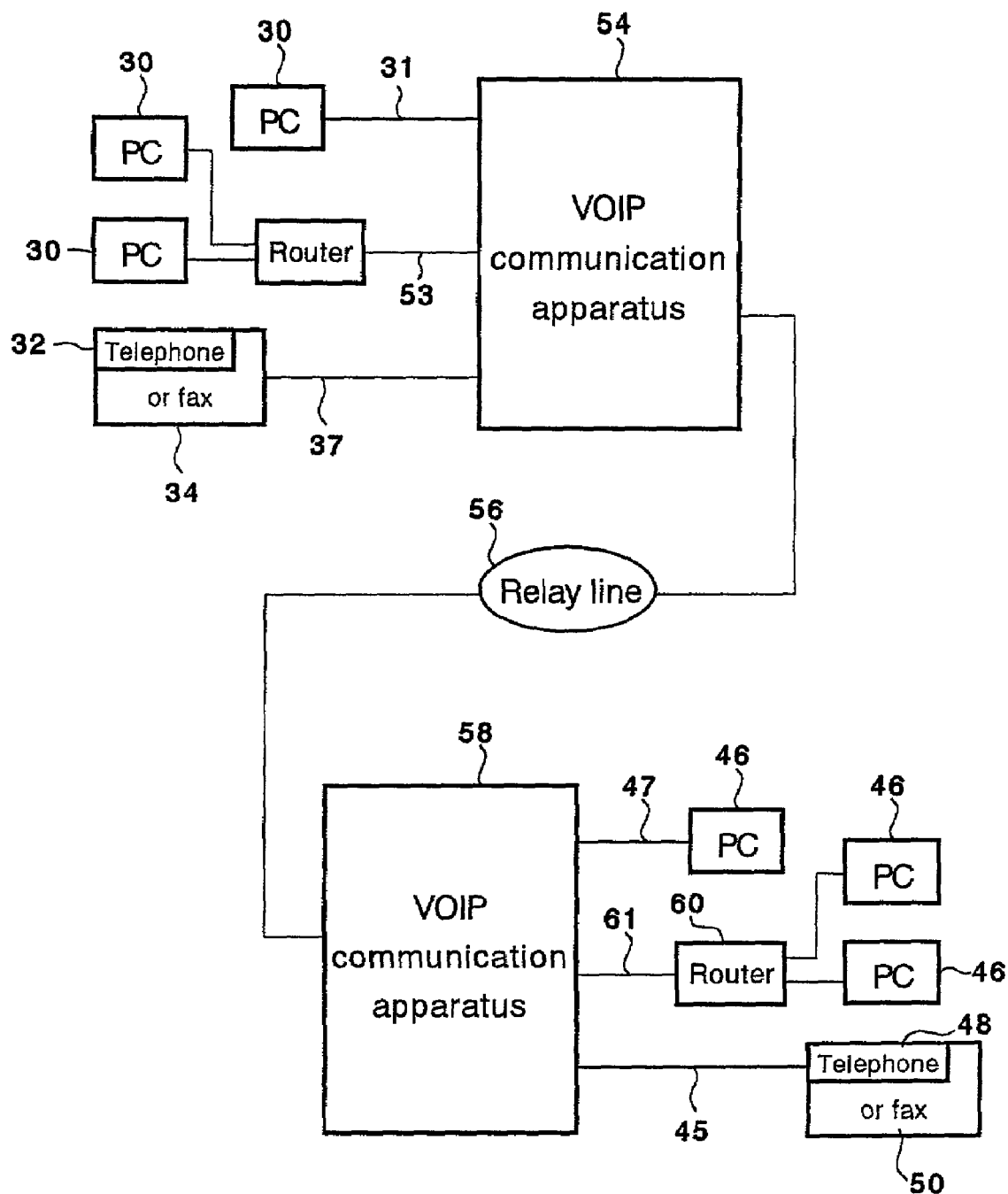
FIG. 5 is a diagram showing a typical implementation of the network system shown in FIG. 4.

FIG. 5 is a diagram showing a typical implementation of the network system shown in FIG. 4. To be more specific, FIG. 5 shows a network system based on the VOIP technology. In the network system shown in FIG. 5, communication apparatuses 54 and 58 are each a communication apparatus adopting the VOIP technology. Examples of such a communication apparatus are a PBX, an exchange and a router.

Figure 6:
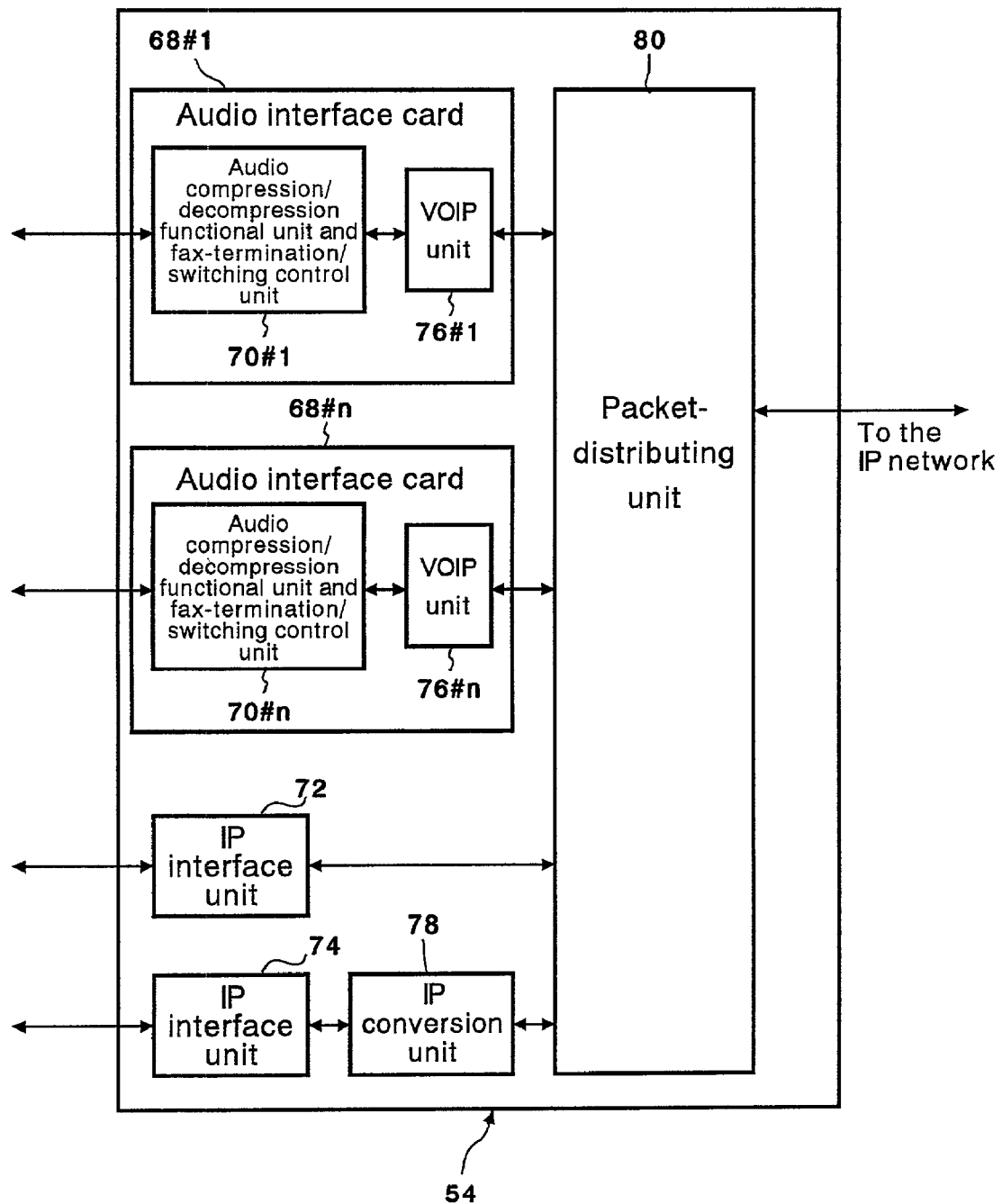
FIG. 6 is a diagram showing the configuration of a communication apparatus included in the network system shown in FIG. 5.

The VOIP communication apparatus 54 accommodates a data network 31 for transmitting PC data from the PC 30, a data network 53 from a router 52 and an audio network 37 for transmitting audio data from a telephone set 32 or a fax machine 34. By the same token, the VOIP communication apparatus 58 accommodates a data network 47 for transmitting PC data from the PC 46, a data network 61 from a router 60 and an audio network 45 for transmitting audio data from a telephone set 48 or a fax machine 50. A relay line 56 is an IP network. FIG. 6 is a diagram showing the configurations of the VOIP communication apparatus 54 or 58 included in the network system shown in FIG. 5. As shown in FIG. 6, the VOIP communication apparatus 54 or 58 comprises audio interface cards 68#i where i=1 to n, an IP interface unit 72, a LAN interface unit 74, an IP conversion unit 78 and a packet-distributing unit 80. The audio interface card 68#i is an audio processing unit for accommodating an audio network. The audio interface card 68#i comprises an audio compression/decompression functional unit and fax-termination/switching control unit 70#i and a VOIP unit 76#i. The audio compression/decompression functional unit and fax-termination/switching control unit 70#i carries out audio compression, audio decompression, fax termination and switching control. The VOIP unit 76#i executes the following functions:

(i) Convert an audio or fax signal output by the audio compression/decompression functional unit and fax-termination/switching control unit 70#i into an IP packet and supply the packet to the packet-distributing unit 80.

(ii) Convert an IP packet output by the packet-distributing unit 80 into an audio or fax signal.

The IP interface unit 72 executes the following functions:

(i) Receive an IP packet from the router 52 and supply the packet to the packet-distributing unit 80.

(ii) Receive an IP packet from the packet-distributing unit 80 and supply the packet to the router 52.

The LAN interface unit 74 interfaces with a LAN. The VOIP unit 76#i executes the following functions:

(i) Convert audio data output by the audio compression/decompression functional unit and fax-termination/switching control unit 70#i into an IP packet and supply the packet to the packet-distributing unit 80.

(ii) Receive an IP packet output by the packet-distributing unit 80 and disassemble the packet into audio data.

The packet-distributing unit 80 distinguishes an IP packet of an audio signal received from the IP network from an IP packet of data also received from the IP network and properly forwards the packet to the audio interface cards 68#i where i=1 to n or the interface unit such as the IP interface unit 72 or the IP conversion unit 78. In the opposite direction, the packet-distributing unit 80 passes on an IP packet of data or an audio signal received from the interface unit to the IP network.

In particular, the present invention is applied to the audio interface card 68#i employed in the VOIP communication apparatus 54 or 58. A system including a multiplexing apparatus for multiplexing an audio signal is another typical network system to which the present invention can be applied.

Figure 7:
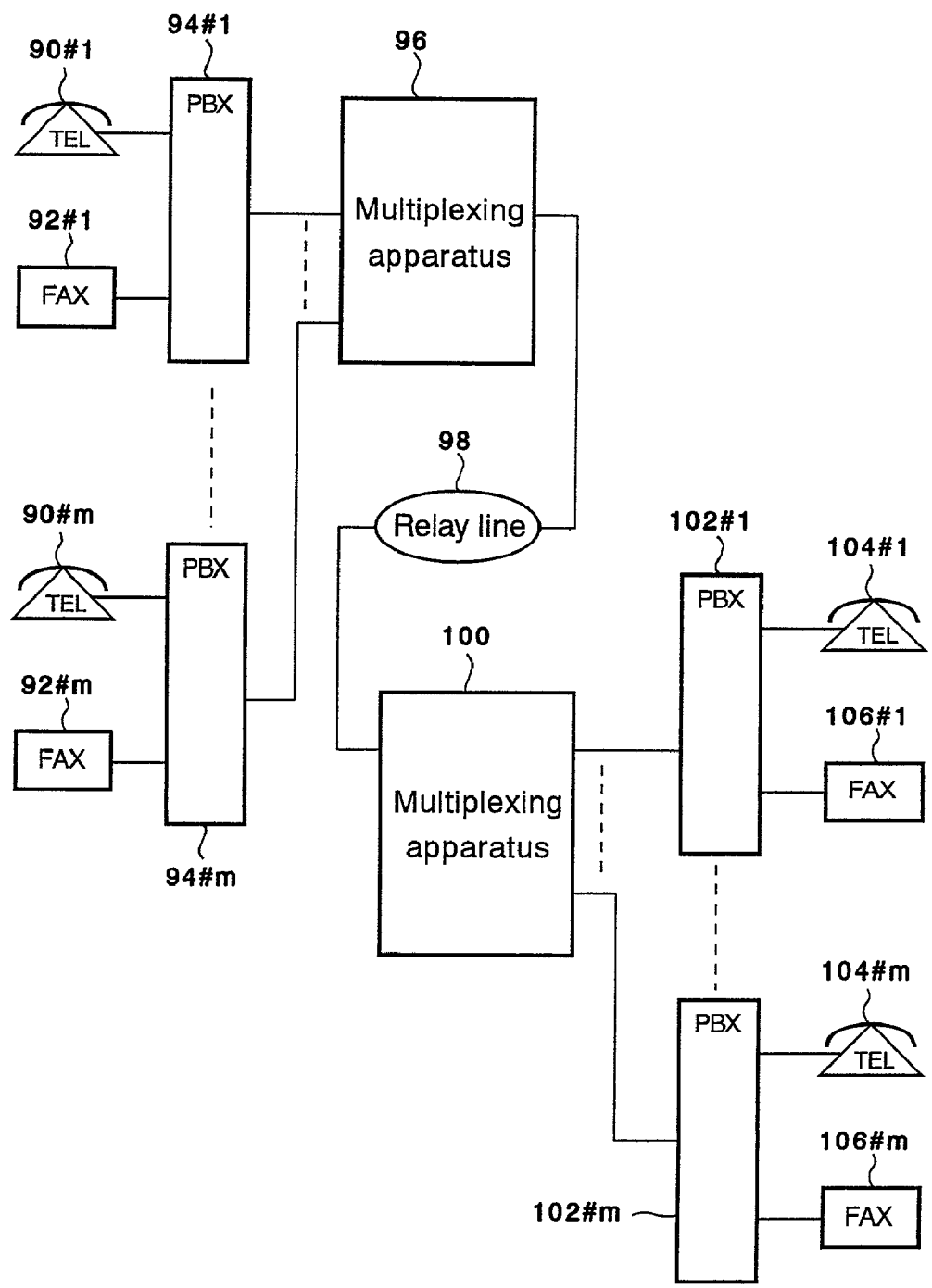
FIG. 7 is a diagram showing the configuration of a typical network system to which the present invention can be applied.

FIG. 7 is a diagram showing the configuration of a typical network system to which the present invention is applied. As shown in FIG. 7, the network system comprises PBXes 94#i each accommodating a telephone set 90#i and a fax machine 92#i, PBXes 102#i each accommodating a telephone set 104#i and a fax machine 106#i where i=1 to m, multiplexing apparatuses 96 and 100 and a relay line 98. The multiplexing apparatus 96 executes the following functions:

(i) Receive an audio or fax signal from the PBX 94#i where i=1 to m. Compress the audio signal. Multiplex the compressed audio signal or the fax signal in a channel assigned to the signal and supply the signal to the relay line 98.

(ii) Receive a multiplexed audio or fax signal from the relay line 98. Decompress the compressed audio signal received through a channel. Supply the decompressed audio signal or a fax signal received from the channel to the corresponding PBX 94#i.

By the same token, the multiplexing apparatus 100 executes the following functions:

(i) Receive an audio or fax signal from the PBX 102#i where i=1 to m. Compress the audio signal. Multiplex the compressed audio signal or the fax signal in a channel assigned to the signal and supply the signal to the relay line 98.

(ii) Receive a multiplexed audio or fax signal from the relay line 98. Decompress the compressed audio signal received through a channel. Supply the decompressed audio signal or a fax signal received from the channel to the corresponding PBX 102#i.

The relay line 98 is a digital line.

Figure 8:
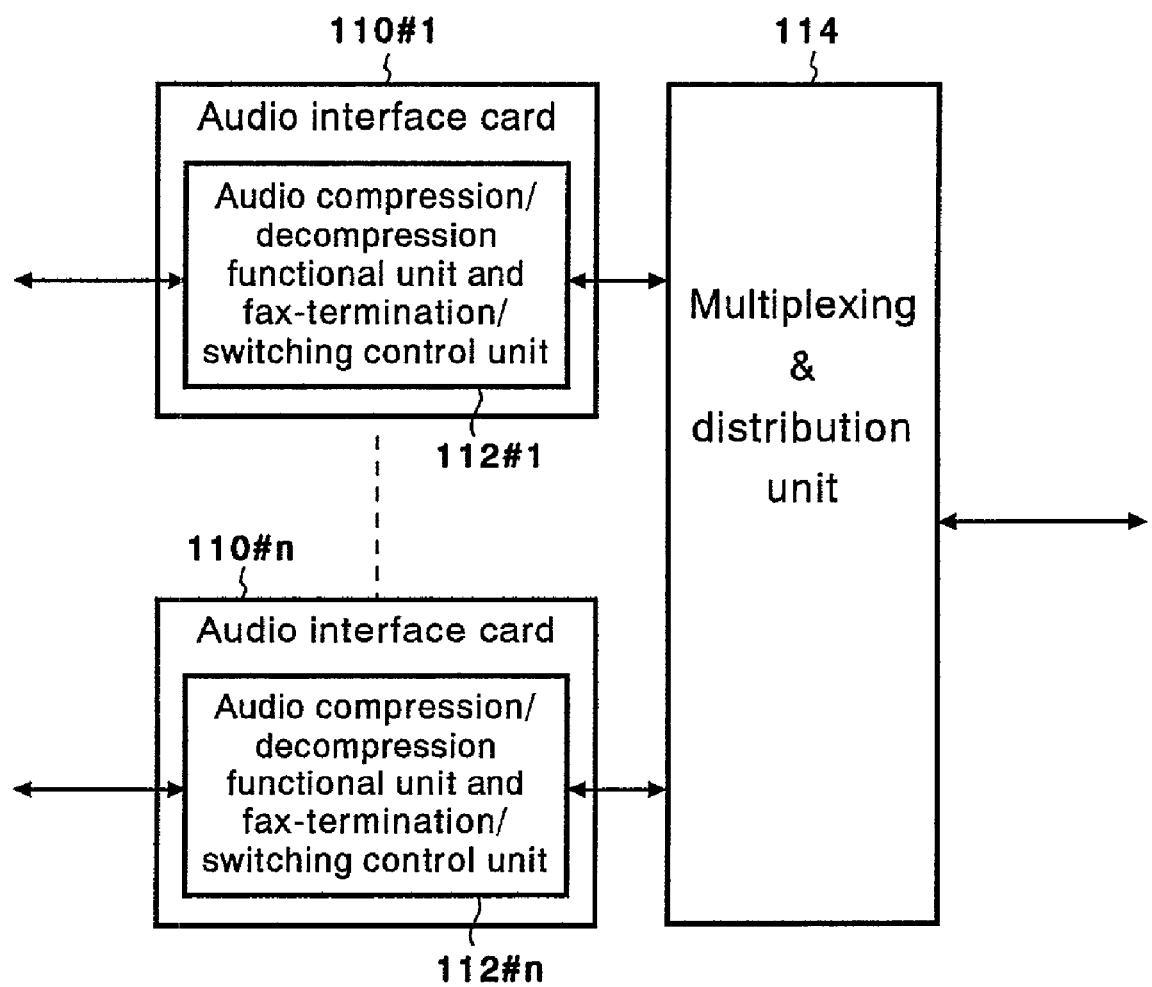
FIG. 8 is a diagram showing the configuration of a multiplexing apparatus included in the network system shown in FIG. 7.

FIG. 8 is a diagram showing the configuration of the multiplexing apparatus 96 included in the network system shown in FIG. 7. As shown in FIG. 8, the multiplexing apparatus 96 comprises audio interface cards 100#i where i=1 to m and a multiplexing & demultiplexing unit 114. The audio interface cards 100#i each include an audio compression/decompression functional unit and fax-termination/switching control unit 112#i. The audio compression/decompression functional unit and fax-termination/switching unit 112#i carries out audio compression, audio decompression, fax termination and switching control. The multiplexing/demultiplexing unit 114 executes the following functions:

(i) Receive a compressed audio signal or a fax signal from an audio interface card 100#i and multiplex the signal in a channel allocated thereto.

(ii) Receive a multiplexed audio signal or a multiplexed fax signal from the relay line through a channel and supply the signal to an audio interface card 100#i assigned thereto.

The present invention is applicable to the audio interface card 100#i employed in the multiplexing unit 96.

First Embodiment

Figure 9:
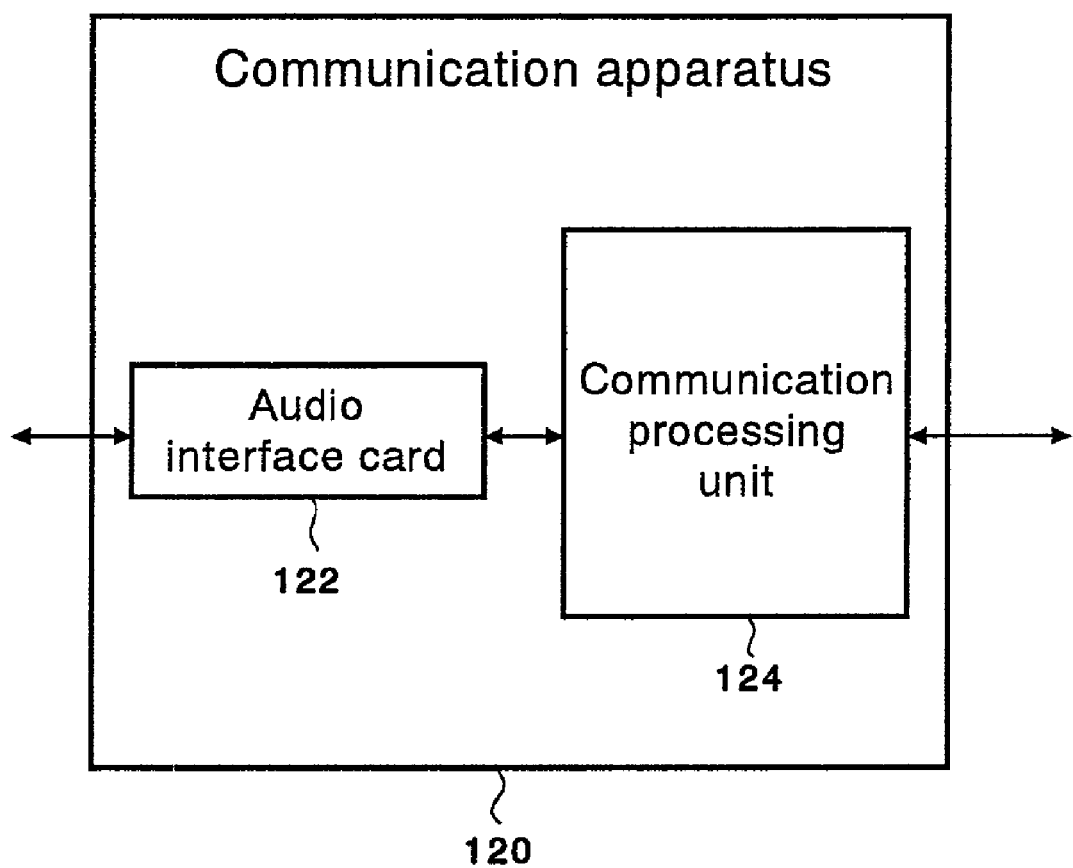
FIG. 9 is a diagram showing the configuration of a communication apparatus implemented by a first embodiment of the present invention.

FIG. 9 is a diagram showing the configuration of a communication apparatus 120 implemented by a first embodiment of the present invention. The communication apparatus 120 shown in FIG. 9 can be used as the communication apparatus 42 or 58 shown in FIG. 4 and the multiplexing apparatus 96 shown in FIG. 6. As shown in FIG. 9, the communication apparatus 120 has an audio interface card 122 and a communication processing unit 124. The audio interface card 122 is an audio processing device for accommodating digital trunks, analog trunks, analog-telephone direct calls, digital-telephone direct calls and audio media such as audio communications from the PC 30. The audio interface card 122 executes the following functions:

(i) Detect an ANSam signal which is a super G3 fax negotiation signal.

(ii) Put the ANSam signal in an exclusion process.

(iii) Add a single tone when the ANSam signal is detected.

(iv) Compress or decompress audio data.

(v) Execute control to turn functions (i) to (iii) on and off.

(vi) Carry out fax termination and switching control.

(vii) In the case of a VOIP system, carry out VOIP processing.

A functional block for executing functions (i) to (vi) is referred to as an audio compression/decompression functional unit and fax-termination/switching control unit.

Figure 10:
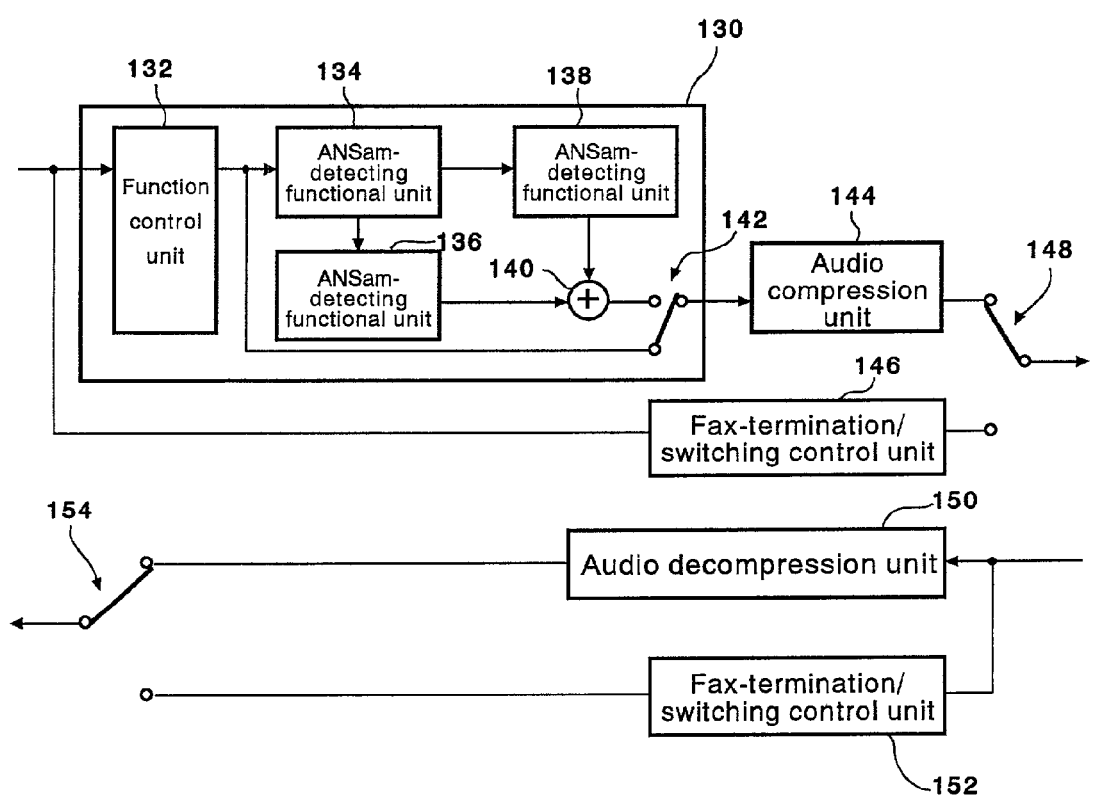
FIG. 10 is a diagram showing an audio compression/decompression functional unit and a fax-termination/switching control unit, which are employed in an audio interface card of the communication apparatus shown in FIG. 9.

FIG. 10 is a diagram showing an audio compression/decompression functional unit and a fax-termination/switching control unit, which are employed in the audio interface card 120 of the communication apparatus shown in FIG. 9. As shown in FIG. 10, the audio compression/decompression functional unit and the fax-termination/switching control unit include a pre-audio-compression exclusion processing block 130, an audio compression unit 144, a fax-termination/switching control unit 146, a switch 148, an audio decompression unit 150, a fax-termination/switching control unit 152 and a switch 154. The pre-audio-compression exclusion processing block 130 carries out an exclusion process for not accepting an ANSam signal transmitted by a fax terminal on the called side to a fax terminal on the calling side in order to let a super G3 fax terminal connected to the communication apparatus 120 carry out a standard G3 fax communication in place of a super G3 fax communication. A standard G3 fax communication replacing a super G3 fax communication conforms to a sequence to switch the communication to a standard G3 fax mode in case the fax terminal on the calling side receives no ANSam signal as prescribed in the recommendation.

Figure 11:
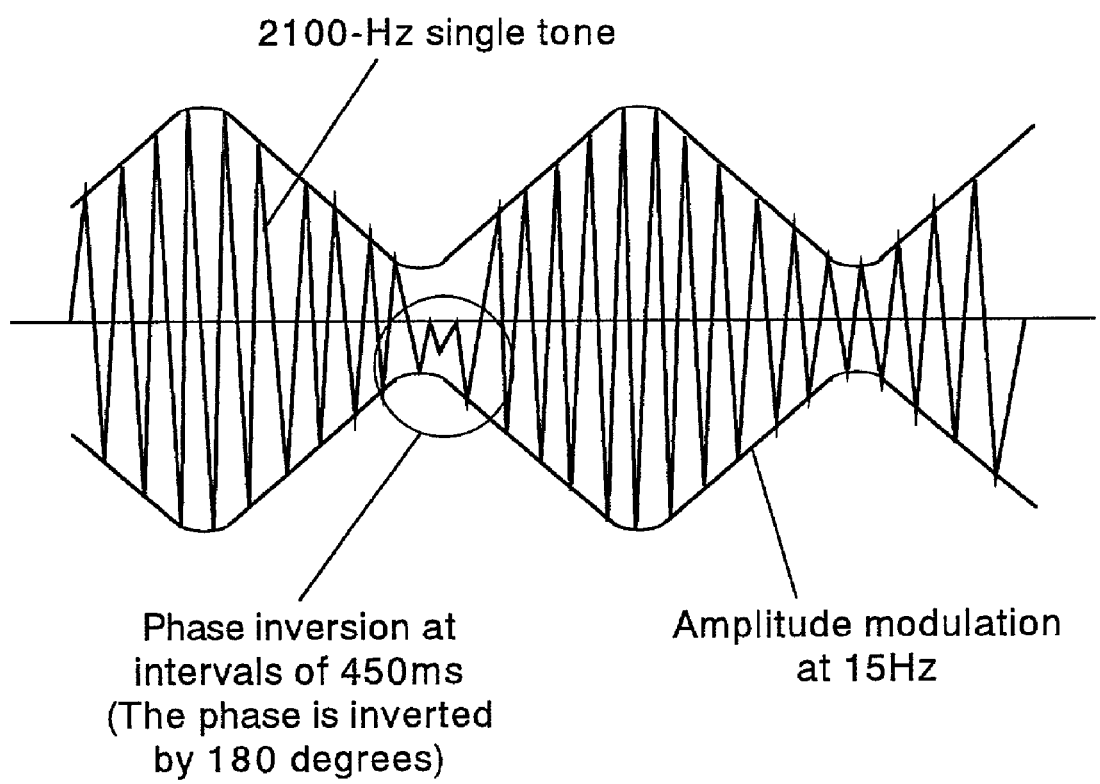
FIG. 11 is a diagram showing the waveform of an ANSam signal.

FIG. 11 is a diagram showing the waveform of an ANSam signal. The super G3 fax communication is prescribed as an annex in the T.30 recommendation. By carrying out a negotiation based on a V.8-recommendation signal using the conventional modem and a V.34 communication, the super G3 fax communication implements a fax communication at a maximum speed of 33,600 bps equivalent to the modem. In order to carry out a super G3 fax communication, first of all, a negotiation using V.8-recommendation signals between the terminals is required. Signals exchanged at that time are a CNG signal transmitted by the terminal on the calling side right after a call and an ANSam signal transmitted by the fax terminal on the called side to the fax terminal on the calling side. As shown in FIG. 11, the ANSam signal is a single tone with a frequency of 2,100 Hz and with the phase thereof inverted by 180 degrees at intervals of 450 ms. The ANSam signal is also a signal obtained as a result of amplitude modulation of a single-tone carrier having the frequency of 2,100 Hz at a frequency of 15 Hz. The ANSam signal is transmitted at a speed of 300 bps. The negotiation is carried out in accordance with the following procedure. When the fax terminal on the calling side detects the ANSam signal, the terminal transmits a CM signal. When the fax terminal on the called side detects the CM signal, the terminal transmits a JM signal. When the fax terminal on the calling side detects the JM signal, the terminal transmits a CJ signal. When the fax terminal on the called side detects the CJ signal, the terminal transmits a CJ signal, transiting to a V.34 communication. Functions to accomplish such a negotiation are all prescribed in the V.8 recommendation.

Figure 12:
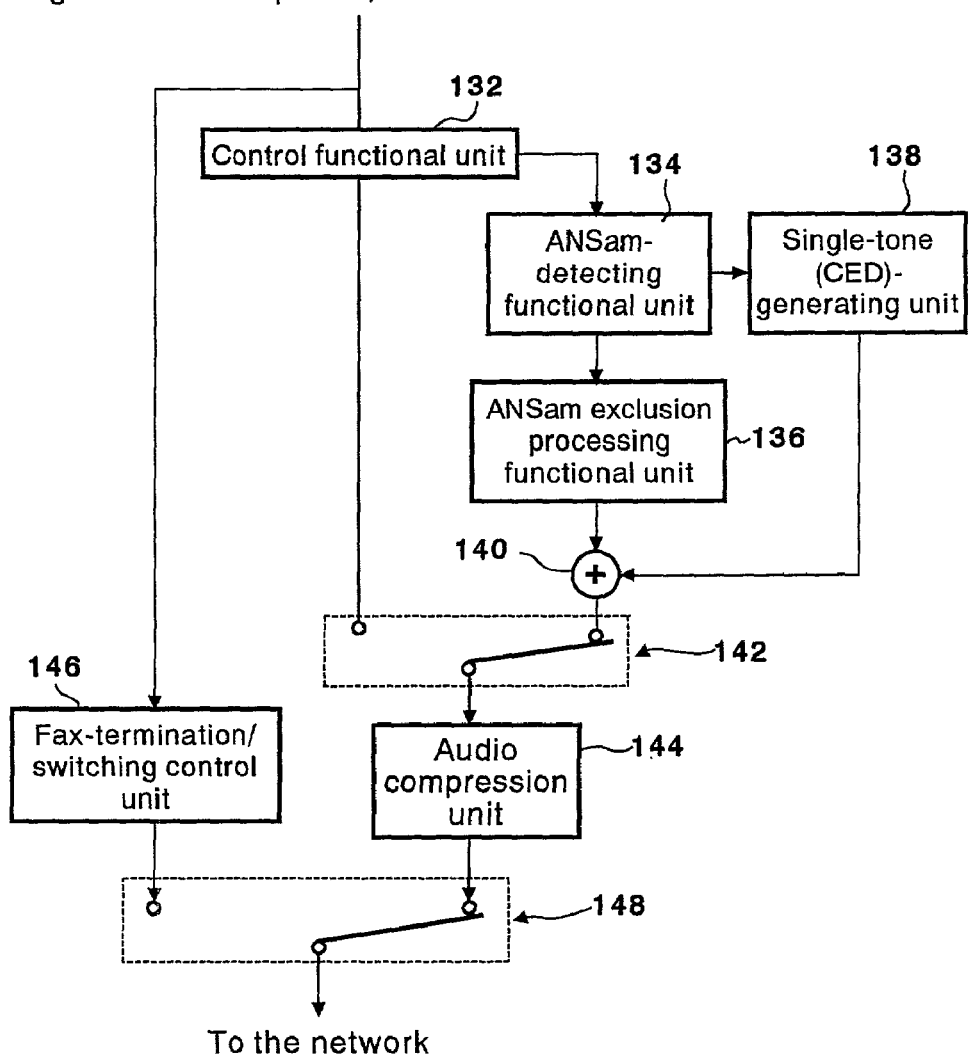
FIG. 12 is a block diagram showing details of an ANSam exclusion processing block employed in the audio interface card shown in FIG. 10.

FIG. 12 is a block diagram showing details of the pre-audio-compression exclusion processing block 130 employed in the audio interface card shown in FIG. 10. As shown in the figure, the pre-audio-compression exclusion processing block 130 comprises a function control unit 132, an ANSam-detecting functional unit 134, an ANSam exclusion processing functional unit 136, a single-tone-generating functional unit 138, a synthesis functional unit 140 and a switch 142. The pre-audio-compression exclusion processing block 130 and the audio compression unit 144 are typically implemented by the same DSP (Digital Signal Processor). To put it concretely, within 1 frame which is a unit of the audio compression processing, a processing time is allocated to each of programs implementing the functions of the function control unit 132, the ANSam-detecting functional unit 134, the ANSam exclusion processing functional unit 136, the single-tone-generating functional unit 138 and the audio compression unit 144. That is to say, each of the programs is executed within the processing time allocated to the program. A typical value of 1 frame is 10 ms. In this way, the implementation can be made very simple by merely making a small change to the program of the audio compression unit 144. In addition, the implementation does not incur an additional cost. In the case of a communication apparatus with no Super G3 fax terminal connected thereto or a communication apparatus having a Super G3 fax terminal connected thereto but no fax-termination/switching control unit for the terminal, it is not necessary to provide a function for subjecting the ANSam signal to an exclusion process. If the exclusion process for the ANSam signal is not required because of such a communication apparatus or because of another reason, the function control unit 132 executes control so as not to implement the exclusion process. If the exclusion process is implemented by software, the software needs to be changed or setting needs to be modified by using control information provided by an external source. If the exclusion process is implemented by hardware, on the other hand, a modification can be made with ease by, for example, changing the setting of a dip switch so as to ignore the ANSam signal. In the case of either method, termination of the exclusion process by adopting one of the following techniques is a basic requirement.

(i) Ignore the ANSam signal.
(ii) Halt the operations of the ANSam exclusion processing functional unit 136 and the single-tone-generating functional unit 138 even if the ANSam signal is detected.
(iii) Let the input signal pass through the audio compression unit 144.

Figure 13:
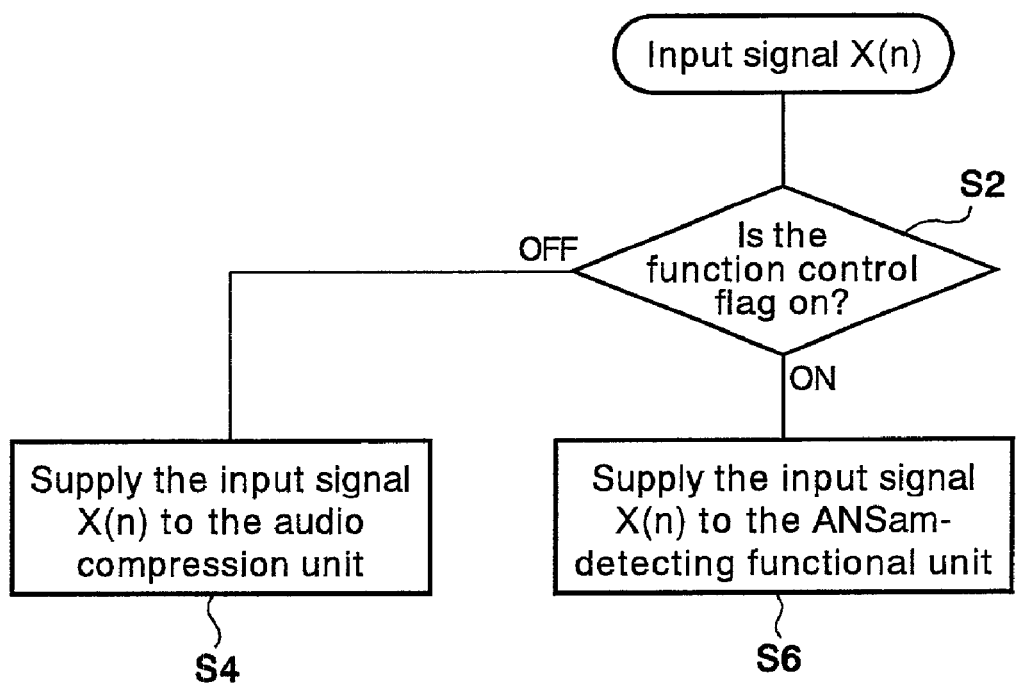
FIG. 13 is a flowchart representing processing carried out by a function control unit employed in the ANSam exclusion processing block shown in FIG. 12.

FIG. 13 is a flowchart representing processing carried out by the function control unit 132 employed in the pre-audio-compression exclusion processing block 130 shown in FIG. 12. As shown in the figure, the flowchart begins with an operation to receive an input signal x (n). At a step S2 the function control unit 132 forms a judgment as to whether a function control flag is on or off. An on state of the function control flag indicates that the ANSam signal is to be subjected to an exclusion process while an off state indicates that the ANSam signal is not to be subjected to an exclusion process and is thus to be accepted. The function control flag is put in an off state if the network system allows a super G3 fax communication to be carried out. In this case, it is not necessary to subject the ANSam signal to an exclusion process. If the function control flag is off, the flow of the processing goes on to a step S4. If the function control flag is on, on the other hand, the flow of the processing goes on to a step S6. At the step S4, the input signal x (n) is supplied to the ANSam-detecting functional unit 134. When the ANSam signal is supplied, the ANSam-detecting functional unit 134 detects the signal during a fixed period not exceeding, say, 50 ms and outputs a result of detection of the ANSam signal. The fixed period does not exceed 66.7 ms, which is the period of a sinusoidal waveform with a frequency of 15 Hz extracted as a component from a signal completing amplitude modulation at a frequency of 15 Hz as described above. This period is set at such a value that the signal component with a frequency of 15 Hz cannot be detected in order to prevent the fax terminal on the calling side from recognizing the ANSam signal. The period is set at that value by considering deletion of the signal component with a frequency of 15 Hz prior to arrival of a signal portion of 1 period corresponding to the frequency of 15 Hz. In this way, it is possible to prevent the signal component with the frequency of 15 Hz from being detected by a super G3 fax terminal capable of detecting a 15 Hz component included in the ANSam signal within a time equal in length to the period of a signal having a frequency of 15 Hz even if such terminal exists.

The ANSam signal is a signal displaying the following three characteristics. In the first place, the ANSam signal includes a tone signal component with a frequency of 2,100 Hz. In the second place, the ANSam signal completes amplitude modulation at a frequency of 15 Hz to convey a 15 Hz tone signal. In the third place, the phase of the ANSam signal is inverted or changed by 180 degrees at intervals of 450 ms. Thus, in order to detect an ANSam signal, there are provided the following methods.

(i) The ANSam signal is recognized by detecting only the signal component with a frequency of 2,100 Hz.
(ii) The ANSam signal is recognized by detecting both the signal component with a frequency of 2,100 Hz and the signal component having a frequency of 15 Hz.

(iii) The ANSam signal is recognized by detecting only the signal component with a frequency of 15 Hz.

In addition, an ANSam signal can also be recognized by detecting phase inversions at intervals of 450 ms. As an alternative, an ANSam signal can also be recognized by detecting the signal components with frequencies of 2,100 Hz and 15 Hz as well as phase inversion at intervals of 450 ms.

It should be noted, however, that the function to detect an ANSam signal varies in dependence on the type of the fax machine. Thus, if the ANSam-detecting functional unit 134 recognizes the ANSam signal by monitoring phase inversions at intervals of 450 ms over a period exceeding 450 ms when a fax terminal recognizes an ANSam signal by detecting only the components with frequencies of 2,100 Hz and 15 Hz, for example, the ANSam signal will arrive at the fax terminal on the calling side during this period. As a result, the fax terminal on the calling side will inevitably accept the ANSam signal ahead of an exclusion process of the ANSam signal and it is thus quite within the bounds of possibility that a communication is started in a super G3 fax mode. In order to eliminate the dependence of the function to detect an ANSam signal on the type of the fax machine so as to give an effect of avoiding the super G3 fax communication uniformly for all fax terminals, it is recommended that an ANSam signal be rather recognized by detecting the three characteristics, namely, the signal component with a frequency of 2,100 Hz, the signal component having a frequency of 15 Hz and phase inversions at intervals of 450 ms. In this way, the ANSam signal can be detected at a high speed, resulting in more merits. As described above, there are methods (i) to (iii) which can be adopted by the ANSam-detecting functional unit 134 to detect an ANSam signal. In particular, method (ii) can be implemented in two ways. In the first way, only the component with a frequency of 2,100 Hz is monitored. If detected, then the component with a frequency of 15 Hz is monitored. If the component with a frequency of 15 Hz is not detected, the ANSam signal is determined to be non-existent. In the second way, both the component with a frequency of 2,100 Hz and the component with a frequency of 15 Hz are monitored and, if both are not detected, the ANSam signal is determined to be non-existent. In either way, nevertheless, the ANSam signal must be detected and subjected to an exclusion process within a fixed period of time. In method (i) whereby the ANSam signal is recognized by detecting only the signal component with a frequency of 2,100 Hz and in method 3 whereby the ANSam signal is recognized by detecting only the signal component with a frequency of 15 Hz, there are various implementations. In a typical implementation, a signal is recognized as ANSam signal if the component is detected continuously during a fixed period. In another typical implementation, a signal is recognized as ANSam signal if the component is detected at a fixed detection rate during a fixed period. An optimum method should be selected in accordance with the usage environment and the detection sensitivity of the communication apparatus. By providing the detection of an ANSam signal component with pre-extinction protection and/or post-detection protection, the incorrect-detection rate can be reduced. The following description explains the pre-extinction protection and the post-detection protection provided to the recognition of an ANSam signal by detection of only the component with a frequency of 2,100 Hz.

Figure 14:
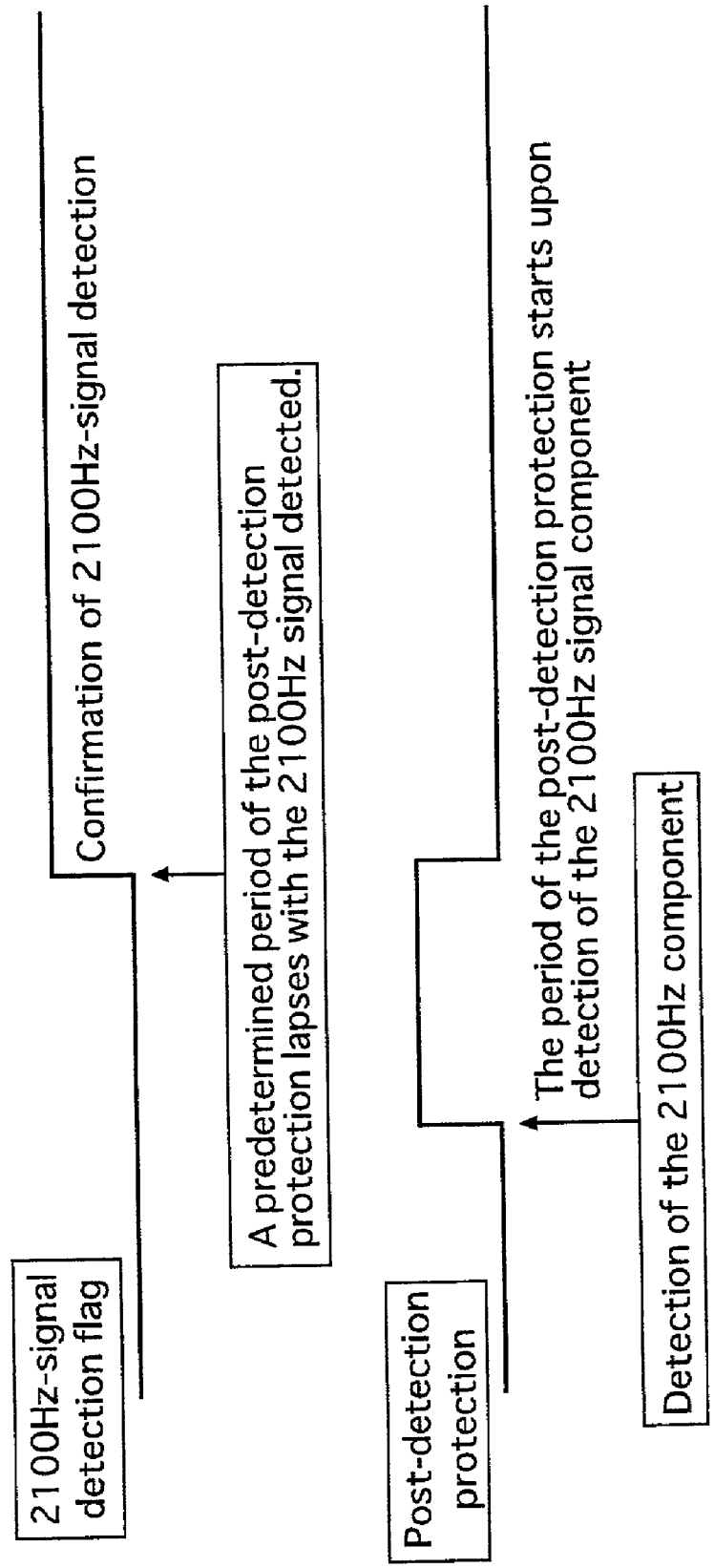
FIG. 14 is time charts of post-detection protection.

FIG. 14 is time charts of the post-detection protection. As shown in FIG. 14, when the signal component with a frequency of 2,100 Hz is detected, a post-detection protection counter starts a counting operation. The post-detection protection counter continues the counting operation as long as the signal component with a frequency of 2,100 Hz is detected. As a post-detection protection time lapses with the detection of the signal component having a frequency of 2,100 Hz, recognition of the ANSam signal is eventually confirmed. There are two concepts of the post-detection protection, either of which may be embraced. In accordance with the first concept, during the period of the post-detection protection, the signal component with a frequency of 2,100 Hz must be detected continuously. If the signal component with a frequency of 2,100 Hz is not detected even at one time during the period of the post-detection protection, the period is canceled and the signal is judged to be a signal other than the ANSam signal. When the signal component with a frequency of 2,100 Hz is detected again, the counting operation is resumed from the beginning to monitor the lapse of the period of the post-detection protection. In accordance with the second concept, when the detection of the signal component with a frequency of 2,100 Hz reaches a predetermined detection rate at a point of time during the period of post-detection protection, the signal is judged to be the ANSam signal. A typical value of the detection rate 10/12, which is a ratio of 10 frames each with a detected signal having a frequency of 2,100 Hz to 12 frames. Thus, a detection of the signal component with a frequency of 2,100 Hz is not automatically interpreted as a recognition of the ANSam signal till the period of the post-detection protection lapses. As a result, incorrect recognition of the ANSam signal is unlikely.

Figure 15:
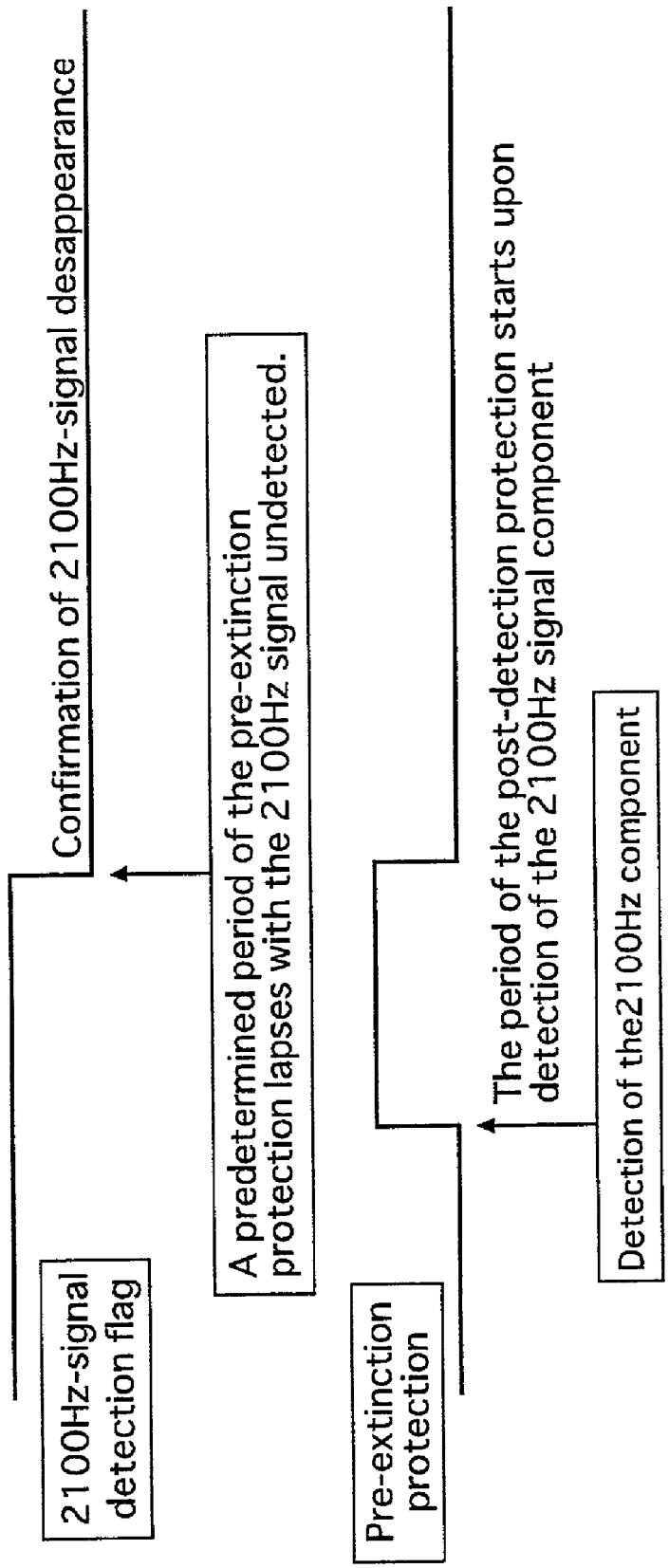
FIG. 15 is time charts of pre-extinction protection.

FIG. 15 is time charts of the pre-extinction protection. As shown in FIG. 15, when the signal component with a frequency of 2,100 Hz is no longer detected during assumed existence of the ANSam signal, a counting operation of the pre-extinction protection is started. As the counter reaches a predetermined value, the extinction of the ANSam signal is confirmed.

By the same token, there are two concepts of the pre-extinction protection, either of which may be embraced. In accordance with the first concept, at a point of time the signal component with a frequency of 2,100 Hz disappears, the period of the pre-extinction protection is started. If the signal component with a frequency of 2,100 Hz is again detected during the period of the pre-extinction protection, however, the counting operation of the pre-extinction protection is discontinued and the existence of the ANSam signal is assumed. If the signal component with a frequency of 2,100 Hz is again undetected during the assumed existence of the ANSam signal, the counting operation of the pre-extinction protection is resumed. Only if the counter of the pre-extinction protection reaches a predetermined value during a period in which the signal component with a frequency of 2,100 Hz is not detected, is the non-existence of the ANSam signal confirmed.

In accordance with the second concept, at a point of time the signal component with a frequency of 2,100 Hz disappears, the period of the pre-extinction protection is started. If the number of times the signal component with a frequency of 2,100 Hz is undetected exceeds a predetermined value at a point of time during the pre-extinction protection, the extinction of the ANSam signal is confirmed. The pre-extinction protection protects the detection of the signal component with a frequency of 2,100 Hz against an operation to inadvertently overlook the existence of the signal component with a frequency of 2,100 Hz. Thus, even if the ANSam signal is instantaneously undetected due to some causes such as a noise, the existence of the ANSam signal is still assumed during the period of the pre-extinction protection. As a result, the precision of the detection of the ANSam signal is assured. That is to say, during the existence of the ANSam signal, the probability of the signal's being undetected is low or, in other words, the ANSam signal can be detected with a high degree of reliability.

Figure 16:
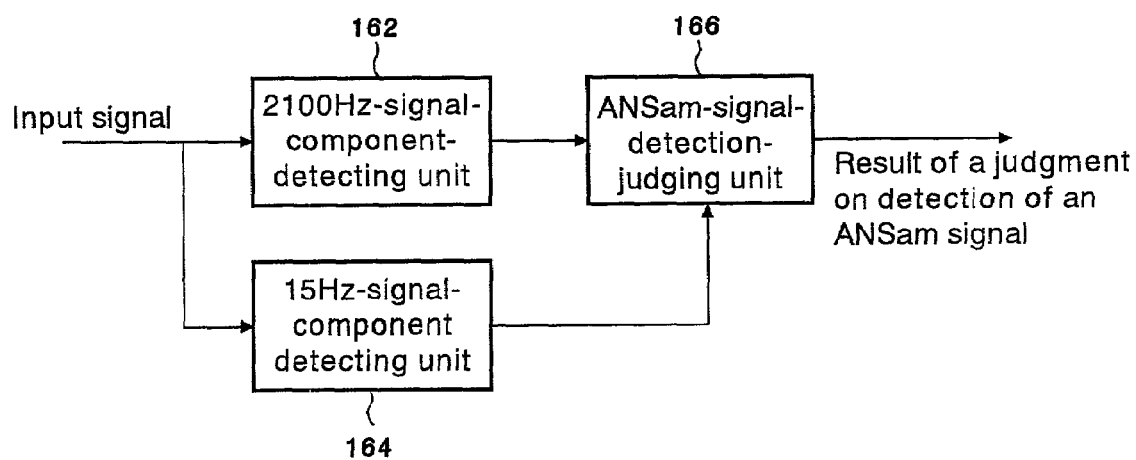
FIG. 16 is a diagram showing the configuration of an ANSam-detecting functional unit employed in the ANSam exclusion processing block shown in FIG. 12.
Figure 17:
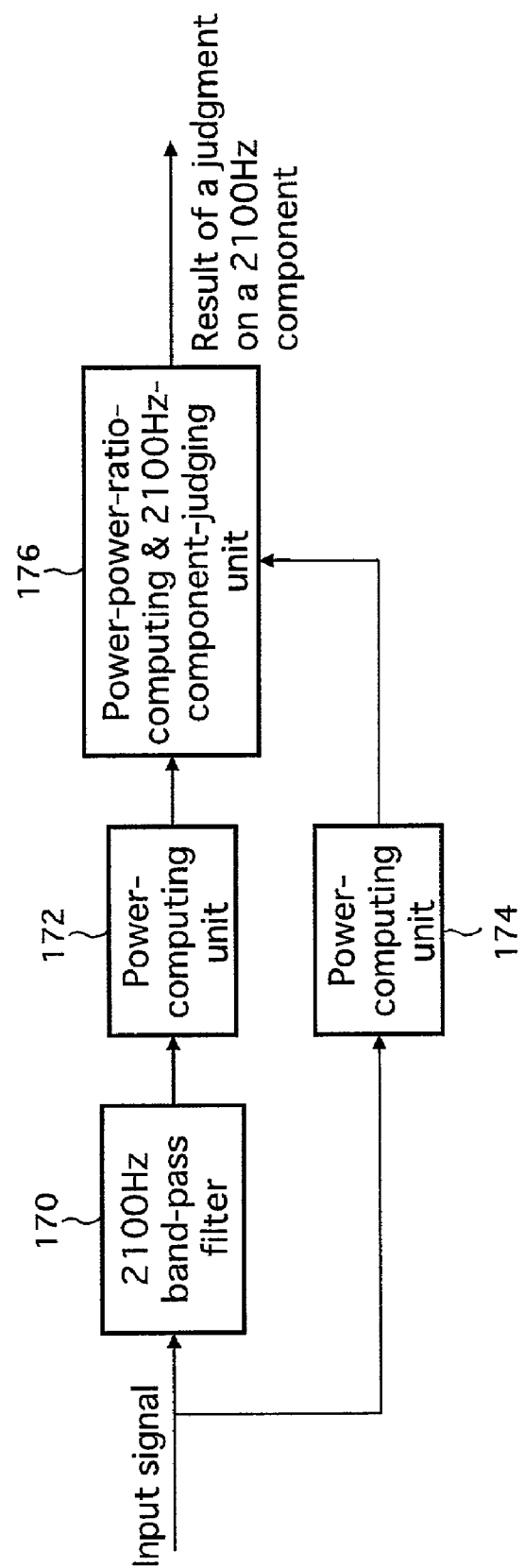
FIG. 17 is a diagram showing the configuration of a 2100 Hz-signal-component detecting unit employed in the ANSam-detecting functional unit shown in FIG. 16.

FIG. 16 is a diagram showing the configuration of the ANSam-detecting functional unit 134 employed in the ANSam exclusion processing block shown in FIG. 12. As shown in FIG. 16, the ANSam-detecting functional unit 134 comprises a 2100 Hz-signal-component-detecting unit 162, a 15 Hz-signal-component-detecting unit 164 and an ANSam-signal-detection-judging unit 166. The 2100 Hz-signal-component-detecting unit 162 detects the signal component having a frequency of 2,100 Hz. FIG. 17 is a diagram showing the configuration of the 2100 Hz-signal-component detecting unit 162 employed in the ANSam-detecting functional unit shown in FIG. 16. As shown in FIG. 17, the 2100 Hz-signal-component-detecting unit 162 comprises a 2100 Hz band-pass filter 170, a power-computing unit 172, another power-computing unit 174 and a power-ratio-computing/2100 Hz-component-judging unit 176.

Figure 18:
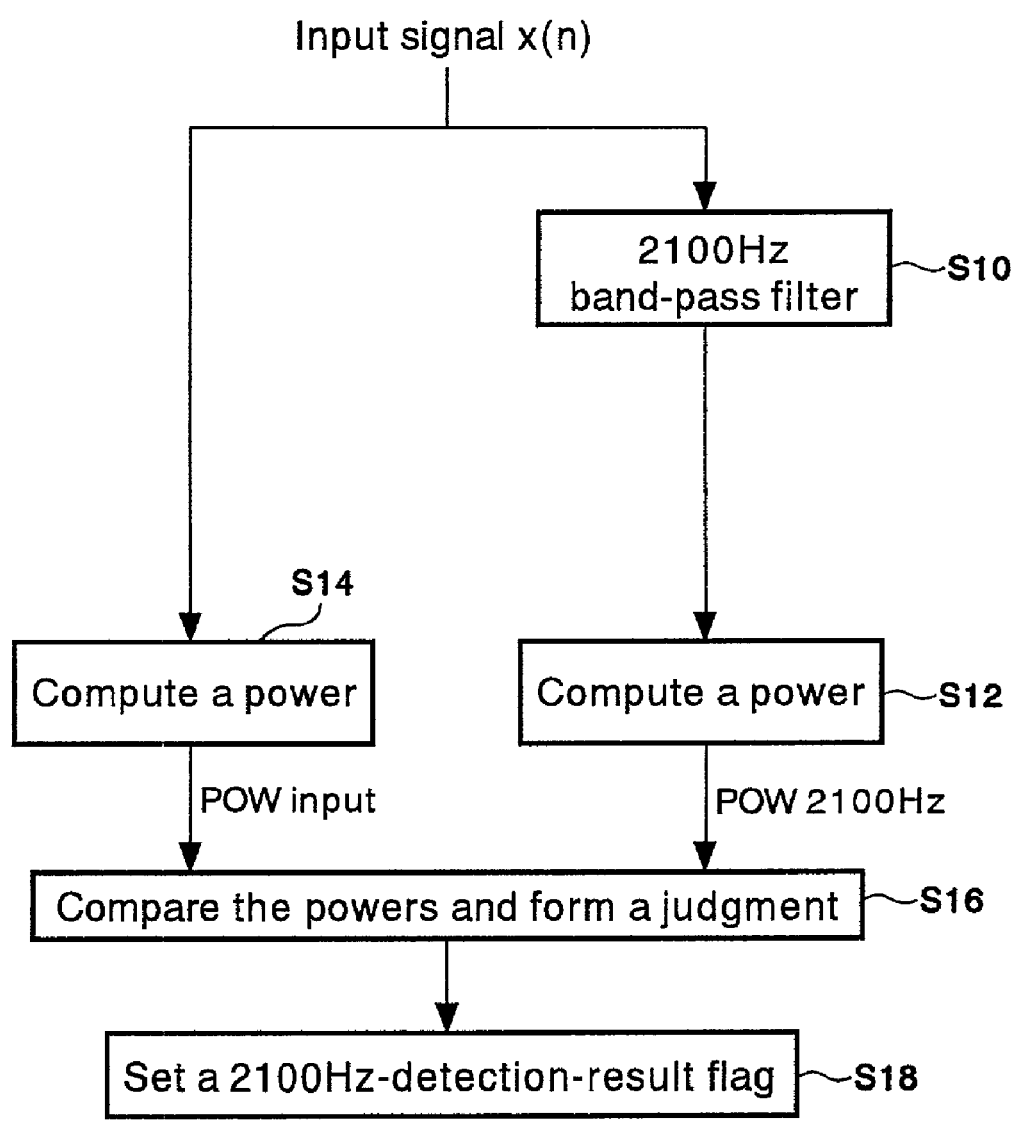
FIG. 18 is a flowchart representing processing to detect a signal component with a frequency of 2,100 Hz.

FIG. 18 is a flowchart representing processing to detect a signal component with a frequency of 2,100 Hz. At a step S10, the 2100 Hz band-pass filter 170 removes components other than the component with a frequency of 2,100 Hz from an input signal, leaving only the component with a frequency of 2,100 Hz. Assume that the input signal is a tone with a frequency of 2,100 Hz. Since the only component frequency of the input signal is 2,100 Hz from the beginning, a signal passing through the 2100 Hz band-pass filter 170 is the input signal with no attenuation entirely or almost as it is. If the input signal is a signal such as an audio signal with components in a variety of bands, on the other hand, the 2100 Hz band-pass filter 170 removes components other than the component with a frequency of 2,100 Hz from an input signal at a point of time the input signal passes through the 2100 Hz band-pass filter 170 and should lower the level of the signal substantially.

The detection of the component with a frequency of 2,100 Hz is based on the state of deterioration described above. To be more specific, the component with a frequency of 2,100 Hz can be detected by comparing a power value obtained by not carrying out any process on the input signal with a power value of a signal output by the 2100 Hz band-pass filter 170. To put it in detail, if the input signal is a tone with a frequency of 2,100 Hz, the signal is hardly attenuated by the 2100 Hz band-pass filter 170. Thus, in this case, the power value of a signal output by the 2100 Hz band-pass filter 170 is almost equal to the power value of the input signal, resulting in a power ratio of close to 1. If the input signal is an audio signal, on the other hand, components with frequencies other than 2,100 Hz are substantially removed by the 2100 Hz band-pass filter 170 from the input signal. Thus, a signal output by the 2100 Hz band-pass filter 170 is a result of much attenuation of the input signal. As a result, the ratio of the power value of the signal output by the 2100 Hz band-pass filter 170 to the power value of the input signal should be smaller than 1. The value of the power ratio is used for detecting the component with a frequency of 2,100 Hz, that is, for distinguishing the tone with a frequency of 2,100 Hz from an audio signal. The 2100 Hz band-pass filter 170 may be implemented by an IIR digital filter employed in the DSP. In this case, the output y (n) of the 2100 Hz band-pass filter 170 is expressed by Eq. (1) as follows:

$$y(n) = \sum_{i=0}^{N} h(i) * x(n-i) \qquad (1)$$

where:
h (i): Coefficient of the 2100 Hz band-pass filter
x (n−i): Input signal
y (n): Output signal
N: Filter coefficient having a value of about 2 for a configuration based on an IIR filter.

At a step S12, the power-computing unit 172 computes the power $POW_{2100HZ}$ of the component with a frequency of 2,100 Hz. In the case of a power-computing unit 172 implemented on the DSP, the output $POW_{2100HZ}$ of the power-computing unit 172 is expressed by Eq. (2) as follows:

$$POW_{2100Hz} = \sum_{i=0}^{N} y(i) * x(n-i) \qquad (2)$$

where the notation y (i) denotes a signal output by the 2100 Hz band-pass filter 170.

At a step S14, the power-computing unit 174 computes the power of the input signal. In the case of a power-computing unit 174 implemented on the DSP, the output $POW_{input}$ of the power-computing unit 174 is expressed by Eq. (3) as follows:

$$POW_{input} = \sum_{i=0}^{N} |x(i)|^2 \qquad (3)$$

where the notation x (i) denotes the input signal.

At a step S16, the power-ratio-computing/2100 Hz-component-judging unit 176 computes a power ratio defined as follows:

Power ratio=Power of the 2100 Hz signal component/Power of the input signal

Then, at the next step S18, a 2100 Hz-detection-result flag is set to indicate detection of the component with a frequency of 2,100 Hz if the power ratio is found greater than a threshold value of typically 0.7. If the power ratio is found smaller than the threshold value indicating no detection of the component with a frequency of 2,100 Hz, on the other hand, the 2100 Hz-detection-result flag is reset.

FIG. 19 is a diagram showing the configuration of the 15 Hz-signal-component detecting unit 164 employed in the ANSam-detecting functional unit shown in FIG. 16. As shown in FIG. 19, the 15 Hz-signal-component-detecting unit 164 comprises a full-wave rectification unit 180, a 15 Hz-low-pass filter 182, a 15 Hz-high-pass filter 184, a power-computing unit 186, another power-computing unit 188 and a power-ratio-computing/15 Hz-component-judging unit 190.

Figure 20:
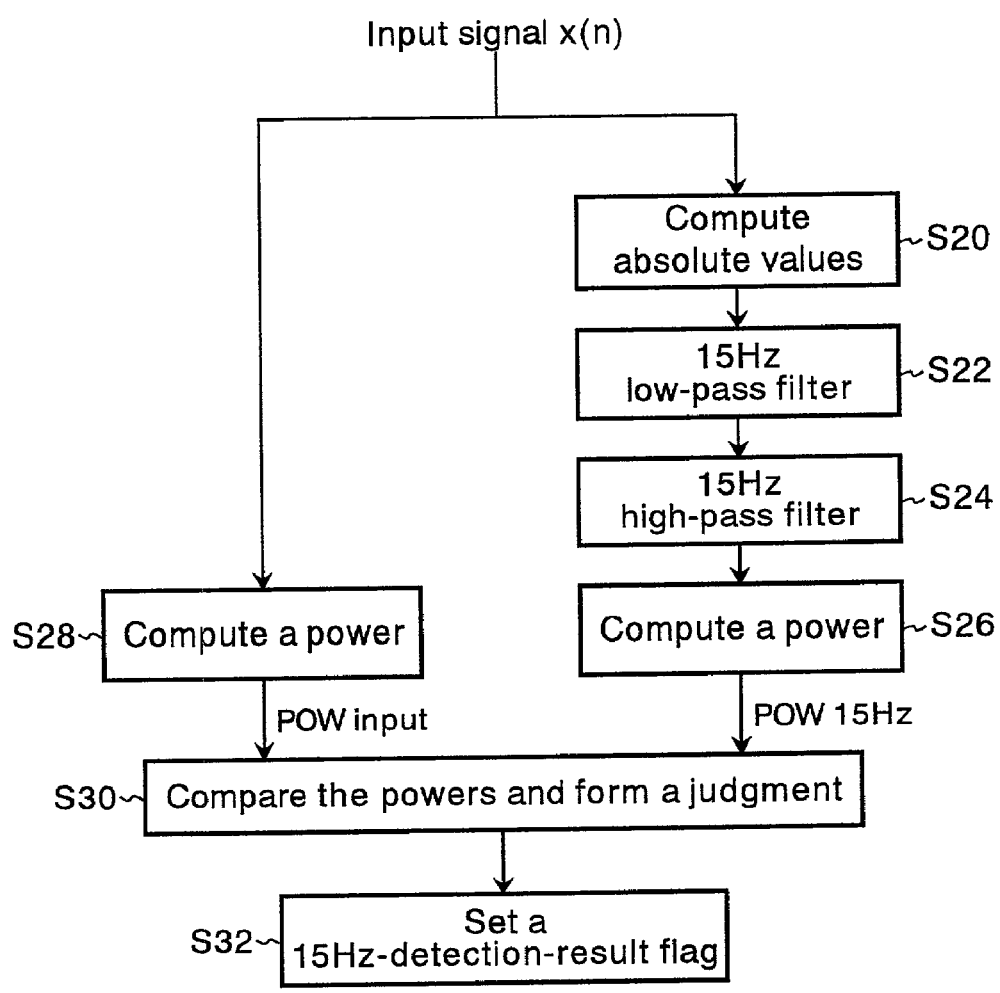
FIG. 20 is a flowchart representing processing to detect a signal component with a frequency of 15 Hz.

FIG. 20 is a flowchart representing processing to detect a signal component with a frequency of 15 Hz. At a step S20, the full-wave rectification unit 180 carries out full-wave rectification in order to take the absolute value of the input signal. At the next step S22, the 15 Hz-low-pass filter 182 removes components each having a frequency higher than 15 Hz from the input signal in order to carry out AM demodulation in case the input signal is an ANSam signal. Thus, the 15 Hz-low-pass filter 182 outputs a signal including only components each having a frequency not higher than 15 Hz. If the 15 Hz-low-pass filter 182 is implemented by an IIR digital filter in the DSP, the signal output by the 15 Hz-low-pass filter 182 can be expressed by Eq. (1) except that the notation h (i) denotes a coefficient of the 15 Hz-low-pass filter 182.

At the next step S24, the 15 Hz-high-pass filter 184 removes components each having a frequency lower than 15 Hz from the signal output by the 15 Hz-low-pass filter 182, leaving only a component with a frequency of 15 Hz in the signal. If the 15 Hz-high-pass filter 184 is implemented by an IIR digital filter in the DSP, the signal output by the 15 Hz-high-pass filter 184 can be expressed by Eq. (1) except that the notation h (i) denotes a coefficient of the 15 Hz-high-pass filter 184. If the input signal is an ANSam signal, the power of the component with a frequency of 15 Hz is 20% of the power of the input signal in accordance with specifications of the ANSam signal. Thus, the power of the signal output by the 15 Hz-high-pass filter 184 should be close to 20% of the power of the input signal. If the input signal includes components in a variety of frequency bands as is the case with an audio signal, on the other hand, only the component with a frequency of 15 Hz is extracted while the other components are eliminated. Thus, the level of the signal output by the 15 Hz-high-pass filter 184 should decrease substantially. The detection of the component with a frequency of 15 Hz is based on the state of level deterioration. To be more specific, the component with a frequency of 15 Hz can be detected by comparing a power value obtained by not carrying out any process on the input signal with a power value of a signal output by the 15 Hz-high-pass filter 184. The value of the power ratio is used for detecting the component with a frequency of 15 Hz, that is, for distinguishing the 15 Hz component of an ANSam signal from the 15 Hz component of an audio signal.

At the next step S26, the power-computing unit 186 computes the power $POW_{15HZ}$ of the 15 Hz component extracted by the 15 Hz-high-pass filter 184. If the power-computing unit 186 is implemented on the DSP, the output $POW_{15HZ}$ of the 15 Hz-high-pass filter 184 can be expressed by Eq. (2) except that the notation y (i) denotes a signal output by the 15 Hz-high-pass filter 184. At a step S28, the power-computing unit 188 computes the power $POW_{input}$ of the input signal. The power-computing unit 188 is essentially the same as the power-computing unit 174 shown in FIG. 17. At the next step S30, the power-ratio-computing/15 Hz-component-judging unit 190 computes a power ratio defined as follows:

Power ratio=Power of the 15 Hz signal component/ Power of the input signal

Then, at the next step S32, a 15 Hz-detection-result flag is set to indicate detection of the component with a frequency of 15 Hz if the power ratio is found greater than a threshold value. If the input signal is an ANSam signal, the power of the component with a frequency of 15 Hz is 20% of the power of the input signal in accordance with specifications of the ANSam signal as described above. Thus, the power of the signal output by the 15 Hz-high-pass filter 184 should be close to 20% of the power of the input signal. That is to say, if the power ratio is found close to 20% at the step S32, 15 Hz-detection-result flag is set. If the power ratio is found smaller than 20% by more than a predetermined difference, indicating no detection of the component with a frequency of 15 Hz, on the other hand, the 15 Hz-detection-result flag is reset. The ANSam-signal-detection-judging unit 166 shown in FIG. 12 implements the post-detection protection and the pre-extinction protection in accordance with a result of a judgment on only the component having a frequency of 2,100 Hz, a result of a judgment on only the component with a frequency of 15 Hz, or a result of a judgment on both the components having the frequencies of 2,100 Hz and 15 Hz as described above in order to detect the ANSam signal. The ANSam-signal-detection-judging unit 166 then outputs information indicating whether or not the ANSam signal has been detected. If the information indicates that the ANSam signal has been detected, the ANSam-signal-detection-judging unit 166 also outputs the amplitude of the component with a frequency of 2,100 Hz.

Figure 21:
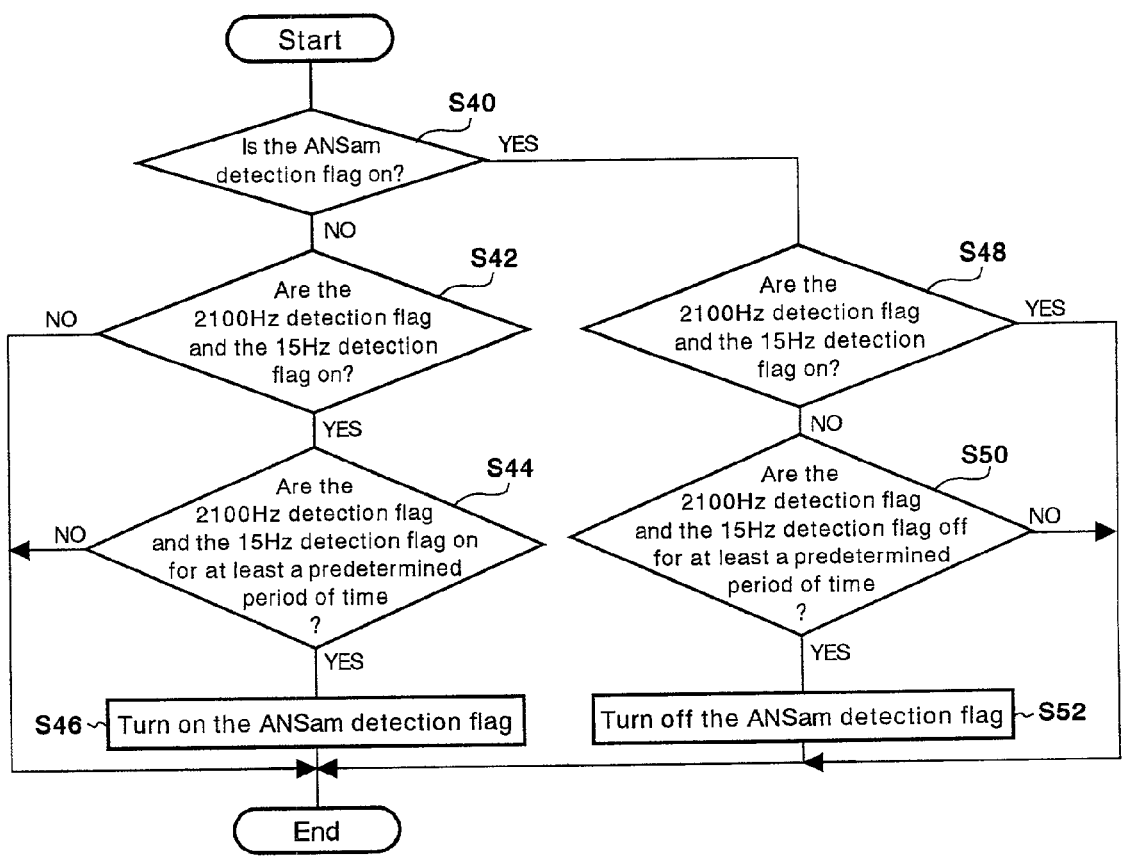
FIG. 21 is a flowchart representing formation of a judgment on an ANSam signal.

FIG. 21 is a flowchart representing formation of a judgment on an ANSam signal. To be more specific, the flowchart shown in FIG. 21 represents typical processing to detect an ANSam signal by implementing the post-detection protection and the pre-extinction protection in accordance with a result of a judgment on both the components having the frequencies of 2,100 Hz and 15 Hz. As shown in the figure, the flowchart begins with a step S40 to form a judgment as to whether an ANSam detection flag is on or off. If the ANSam detection flag is off, the flow of the processing goes on to a step S42. If the ANSam detection flag is on, on the other hand, the flow of the processing goes on to a step S48. At the step S42, the 2100 Hz-detection-result flag and the 15 Hz-detection-result flag are examined to form a judgment as to whether or not the 2100 Hz-detection-result flag and the 15 Hz-detection-result flag satisfy at least one of the following predetermined conditions:

(i) The 2100 Hz-detection-result flag is on.
(ii) The 15 Hz-detection-result flag is on.
(iii) The 2100 Hz-detection-result flag and the 15 Hz-detection-result flag are both on.
(iv) The 2100 Hz-detection-result flag or the 15 Hz-detection-result flag is on.

If the 2100 Hz-detection-result flag and the 15 Hz-detection-result flag satisfy at least one of the predetermined conditions, the flow of the processing goes on to a step S44. If the 2100 Hz-detection-result flag and the 15 Hz-detection-result flag satisfy none of the predetermined conditions, on the other hand, the processing is terminated. At the step S44, a period of time during which at least one of the predetermined conditions is satisfied is examined to form a judgment as to whether or not the period of time is continuous and at least equal in length to a predetermined value referred to hereafter as a post-detection-protection period. If the period of time is continuous and at least equal in length to the predetermined value, the flow of the processing goes on to a step S46. Otherwise, the processing is ended. At the step S46, the ANSam detection flag is turned on. In this way, at the end of the implementation of the post-detection protection at the steps S40 to S46, the ANSam detection flag is turned on.

At a step S48, the 2100 Hz-detection-result flag and the 15 Hz-detection-result flag are examined to form a judgment as to whether or not the 2100 Hz-detection-result flag and the 15 Hz-detection-result flag satisfy at least one of the conditions predetermined for the step S42. If none of the conditions is satisfied, the flow of the processing goes on to a step S50. If at least one of the conditions is satisfied, on the other hand, the processing is ended. At the step S50, a period of time during which none of the predetermined conditions is satisfied is examined to form a judgment as to whether or not the period of time is continuous and at least equal in length to a predetermined value referred to hereafter as a pre-extinction-protection period. If the period of time is continuous and at least equal in length to the predetermined value, the flow of the processing goes on to a step S52. Otherwise, the processing is ended. At the step S52, the ANSam detection flag is turned off. In this way, at the end of the implementation of the pre-extinction protection at the steps S40 to S52, the ANSam detection flag is turned off.

Figure 22:
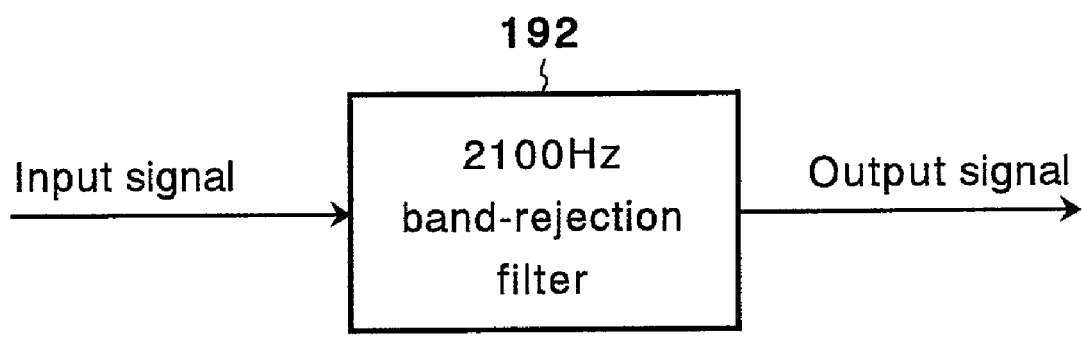
FIG. 22 is a diagram showing the configuration of an ANSam exclusion processing functional unit employed in the ANSam exclusion processing block shown in FIG. 12.

FIG. 22 is a diagram showing the configuration of the ANSam exclusion processing functional unit 136 employed in the ANSam exclusion processing block shown in FIG. 12. As shown in FIG. 22, the ANSam exclusion processing functional unit 136 has a 2100 Hz band-rejection filter 192.

Figure 23:
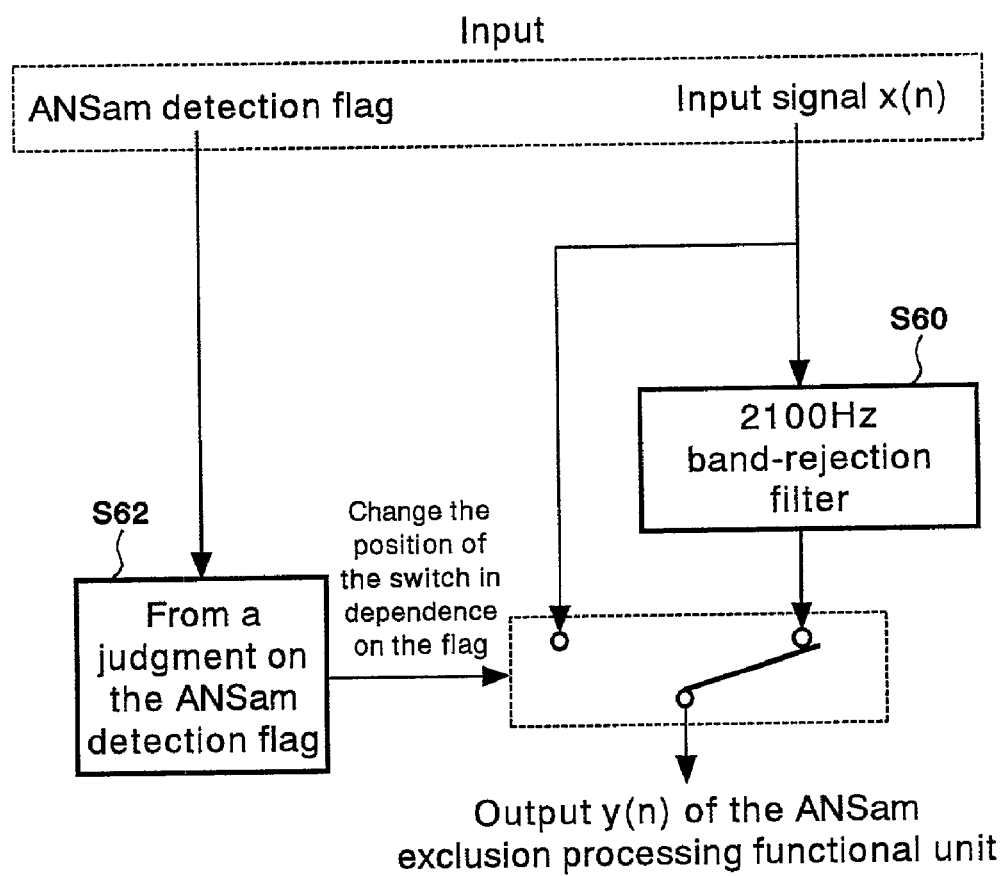
FIG. 23 is a flowchart representing an ANSam exclusion process.

FIG. 23 is a flowchart representing an ANSam exclusion process. At a step S60, the 2100 Hz band-rejection filter 192 removes components with frequencies of 2,100 Hz±15 Hz, that is, frequencies in the range 2,085 Hz to 2,115 Hz, from an input signal in the case of an ANSam signal judgment result confirming detection of an ANSam signal. If the 2100 Hz band-rejection filter 192 is implemented by an IIR digital filter in the DSP, the signal output by the 2100 Hz band-rejection filter 192 can be expressed by Eq. (1) except that the notation h (i) denotes a coefficient of the 2100 Hz band-rejection filter 192. As a result, the ANSam signal's component with a frequency of 2,100 Hz and an amplitude-modulation signal with a frequency of 15 Hz are all removed from the input signal. That is to say, the ANSam signal itself is eliminated from the input signal. At a step S62, the ANSam detection flag is examined. If the ANSam detection flag is on, the output y (n) of the 2100 Hz band-rejection filter 192 is supplied to the synthesis functional unit 140. If the ANSam detection flag is off, on the other hand, the input signal x (n) itself is supplied to the synthesis functional unit 140. That is to say, if the ANSam detection flag is off, the input signal x (n) is used as the output y (n) of the ANSam exclusion processing functional unit 136.

In order to block the super G3 fax communication and adopt the ordinary G3 fax procedure instead, the ANSam signal needs to be subjected to an exclusion process. However, the ANSam signal should not be eliminated by merely blocking the signal. This is because, if an audio signal is detected incorrectly as an ANSam signal, the audio signal is also eliminated. That is to say, if an audio signal is detected incorrectly as an ANSam signal, a sound or a voice represented by the audio signal is interrupted. In order to solve this problem, the ANSam exclusion processing functional unit 136 removes only components with frequencies in the range 2,100 Hz±15 Hz, that is, the component having a frequency of 2,100 Hz and the amplitude-modulation signal having a frequency of 15 Hz, even if an ANSam signal is detected. Thus, only the detected ANSam signal is removed with a high degree of reliability. That is to say, even if an audio signal is incorrectly detected as an ANSam signal, components with frequencies outside the range 2,100 Hz±15 Hz are passed on as they are. As a result, the audio signal is by no means eliminated. Even if components in the range 2,100 Hz±15 Hz are removed from an audio signal, a difference in audio quality of the signal is almost unfelt. Therefore, by passing on components with frequencies outside the range 2,100 Hz±15 Hz as they are, it is possible to minimize deterioration in audio quality resulting from incorrect detection of an audio signal as an ANSam signal.

By the way, when a fax sender sends a fax message by carrying out manual operations, the sender makes a phone call to a communication partner on the called side and listens to a CED tone in order to verify that the communication partner is a fax terminal. Then, the sender starts a fax communication by merely pressing a start button. Thus, by merely subjecting the ANSam signal output by the super G3 fax terminal to an exclusion process, the sender will not be capable of hearing the ANSam signal's component with a frequency of 2,100 Hz and hence forming a judgment as to whether or not the called communication partner is a fax terminal. In order to solve this problem, the following technique is adopted to allow a fax message to be transmitted by carrying out manual operations.

Figure 24:
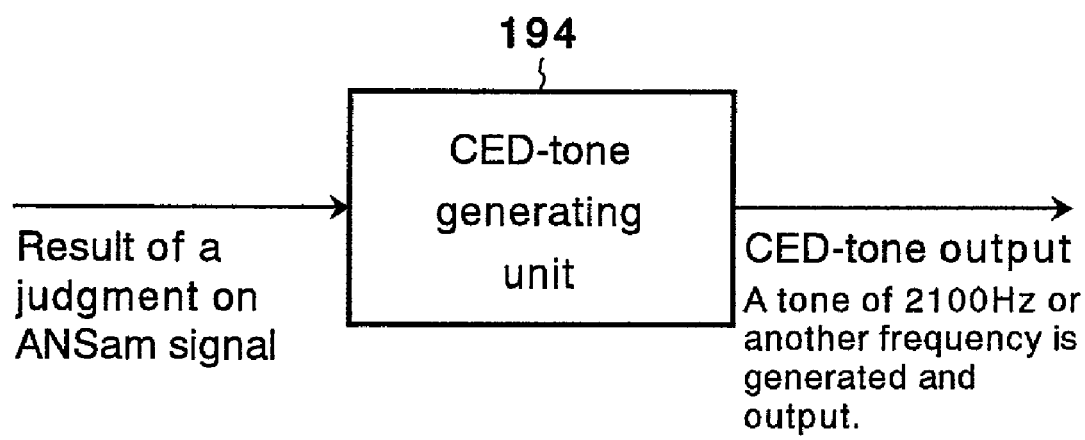
FIG. 24 is a diagram showing the configuration of a CED-tone-generating functional unit employed in the ANSam exclusion processing block shown in FIG. 12.
Figure 25:
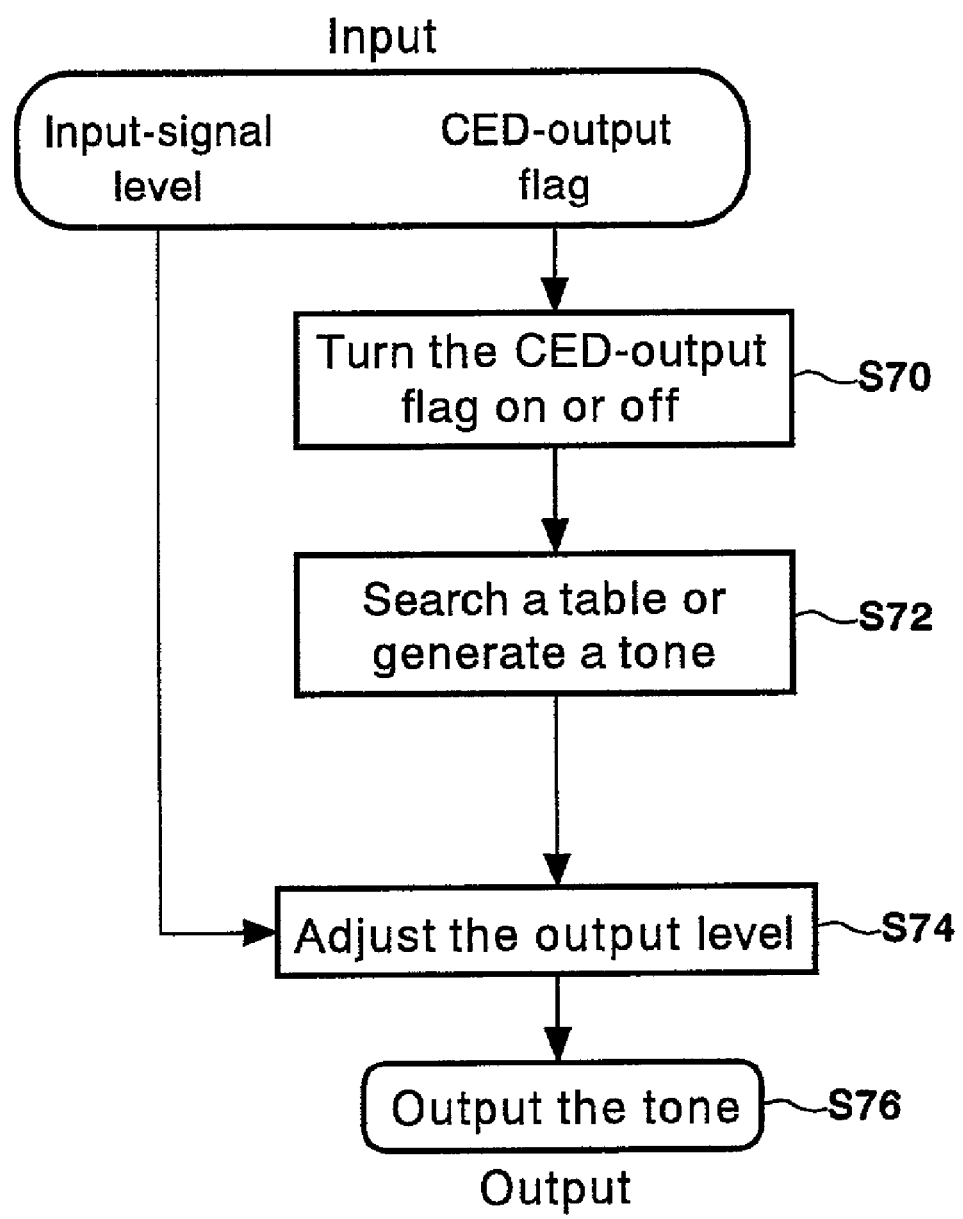
FIG. 25 is a flowchart representing generation of a CED tone.
Figure 26:
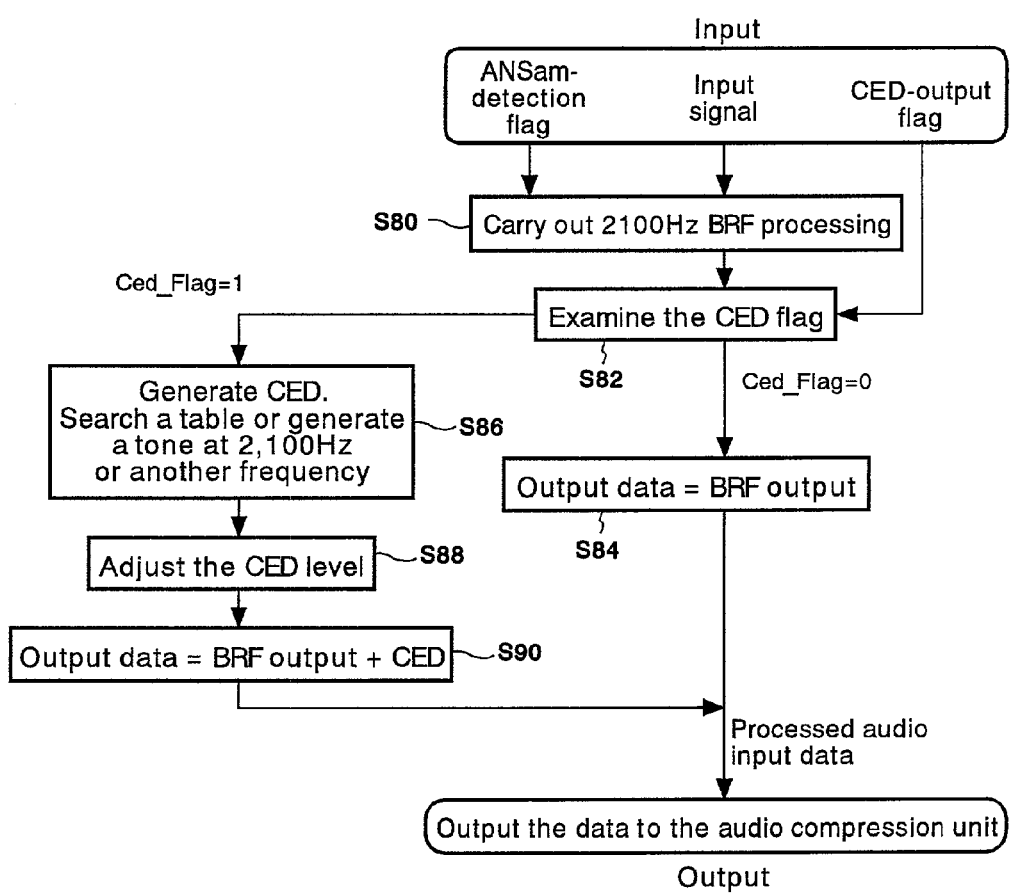
FIG. 26 is a flowchart representing an ANSam exclusion process, CED-tone generation and synthesis.
Figure 27:
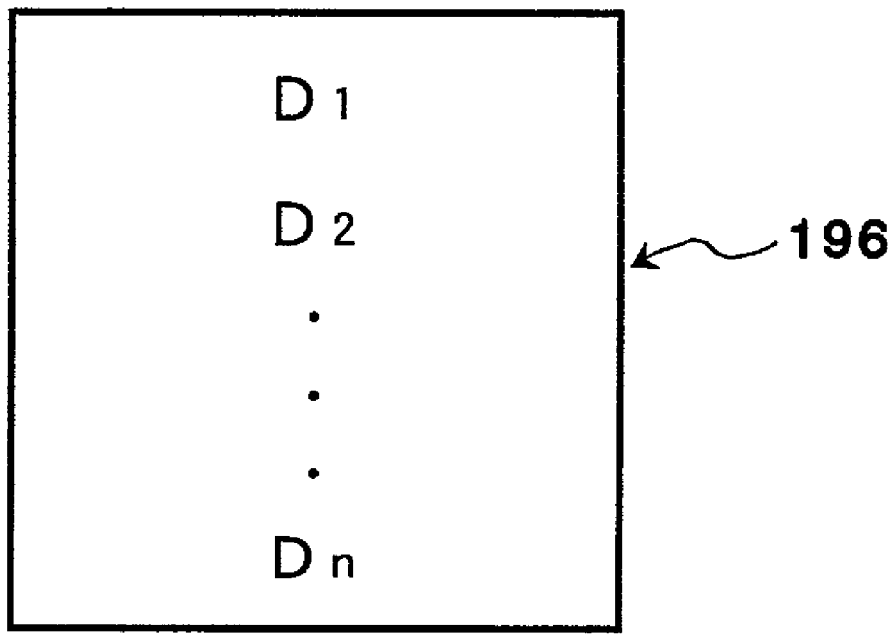
FIG. 27 is a diagram showing the structure of a table for tone generation.

FIG. 24 is a diagram showing the configuration of the CED-tone-generating functional unit 138 employed in the ANSam exclusion processing block shown in FIG. 12. As shown in FIG. 24, the single-tone-generating functional unit 138 has a CED-tone-generating unit 194. FIG. 25 is a flowchart representing generation of a CED tone. FIG. 26 is a flowchart representing an ANSam exclusion process, CED-tone generation and synthesis. At a step S70 of the flowchart shown in FIG. 25 and a step S80 of the flowchart shown in FIG. 26, the CED-tone-generating unit 194 examines a CED flag (Ced_Flag). The ANSam-detecting functional unit 134 turns on the CED flag (Ced_Flag=1) if the ANSam detection flag is on but turns off the CED flag (Ced_Flag=0) if the ANSam detection flag is off. If the CED flag is on, the flowchart shown in FIG. 25 goes on to a step S72 and the flowchart shown in FIG. 26 goes on to a step S86. At the steps S72 and S86, a CED tone is generated. A CED tone is a signal which is heard by a user, informing the user that the transmitting terminal is a fax terminal. Thus, a CED tone can be protected against ANSam-signal detection by a fax terminal by generation of the tone at a frequency of typically 2,000 Hz. The following methods are adopted in the implementation of the CED-tone-generating unit 194:

(i) A single tone having a unit amplitude and lasting for 1 period is sampled in a sampling period and the resulting sampling data is stored in a tone generation table 196 in advance. During a period of an ANSam signal's being detected in accordance with a result of a judgment on the ANSam signal, the sampling data is read out from the tone generation table 196 repeatedly at sampling-period intervals to generate a CED tone. FIG. 27 is a diagram showing the structure of the tone generation table 196 for tone generation. As shown in FIG. 27, the tone generation table 196 contains pieces of sampling data Di where i=1 to n. The frequency f of the tone is equal to fs/n (f=fs/n) where the symbol fs denotes the sampling frequency. For f=2,000 Hz and fs=8,000 Hz, for example, the sampling-data count n in the tone generation table 196 is n=fs/f=4.

(ii) A CED tone is generated in accordance with a computation based on Eq. (4) given below:

$$y(n)=A^*\sin(2\pi f^* n/fs) \qquad (4)$$

where y (n): Output tone data

A: Amplitude (level) of the output tone data f: Frequency of the output tone fs: Sampling frequency Finally, at a step S74 of the flowchart shown in FIG. 25 and a step S88 of the flowchart shown in FIG. 26, the amplitude of the CED tone generated by adoption of method (i) or (ii) is adjusted to the same level of the input signal. The synthesis functional unit 140 in FIG. 26 adds the CED tone to a BRF output at the next step S90 for an on CED flag and supplies the sum to the audio compression unit 144. The output BRF is output by the ANSam exclusion processing functional unit 136 at the step S80 as a result obtained by eliminating only the component in a band of 2,100 Hz and leaving components in other bands as they are. For an off CED flag, however, only the BRF output is supplied to the audio compression unit 144 at a step S84.

Figure 28A:
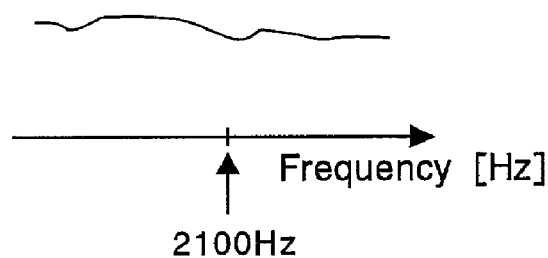
FIG. 28A is a diagram showing a spectrum of an input signal.
Figure 28B:
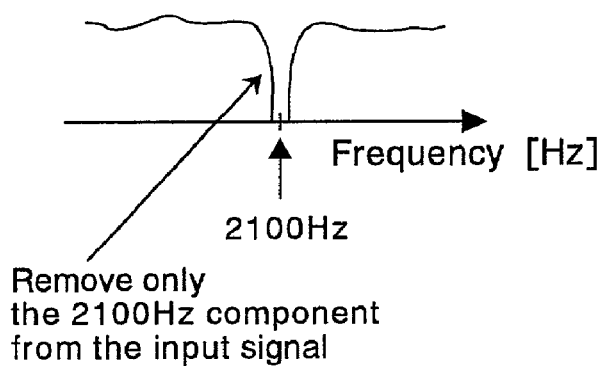
FIG. 28B is a diagram showing a frequency spectrum after an ANSam exclusion process.
Figure 28C:
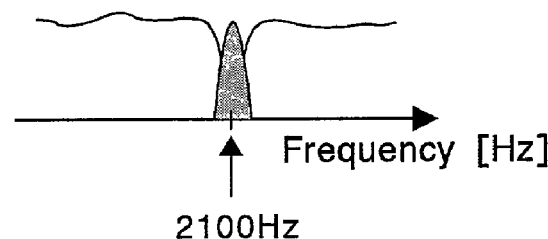
FIG. 28C is a diagram showing a frequency spectrum after addition of a CED tone.

FIGS. 28A to 28C are each a diagram showing a spectrum related to an operation to protect an audio quality. To be more specific, FIG. 28A shows a spectrum of the input signal and FIG. 28B shows a frequency spectrum after an ANSam exclusion process. FIG. 28C is a diagram showing a frequency spectrum after addition of a generated CED tone. When an audio signal or the like is incorrectly detected as an ANSam signal, components having frequencies outside the range 2,100±15 Hz are passed on as they are as shown in FIG. 28B, and a CED signal having the same power as the 2100 Hz component of the input signal is added as shown in FIG. 28C to all but prevent the quality of the audio signal from deteriorating.

Figure 29A:
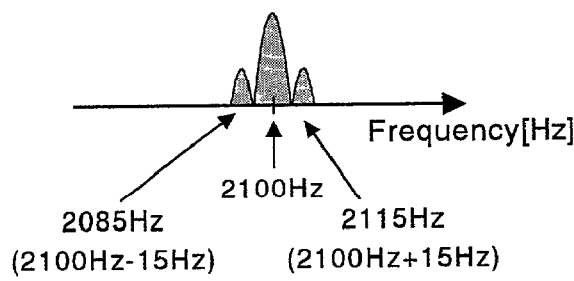
FIG. 29A is a diagram showing a spectrum of an input signal.
Figure 29B:
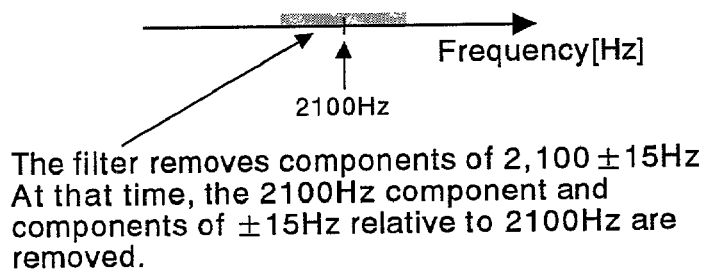
FIG. 29B is a diagram showing a frequency spectrum after an ANSam exclusion process.
Figure 29C:
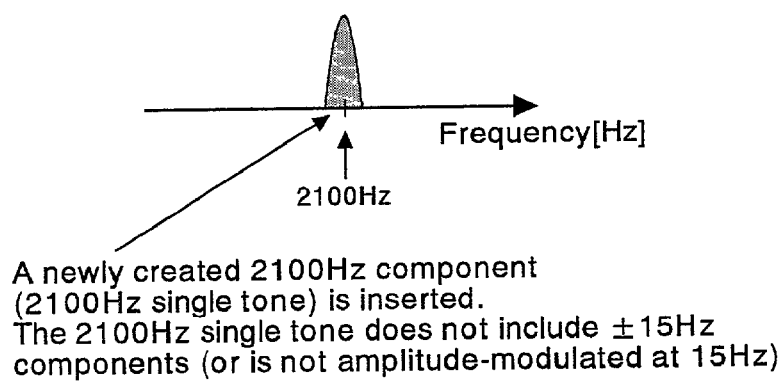
FIG. 29C is a diagram showing a frequency spectrum after addition of a CED tone.

FIGS. 29A, 29B and 29C are each an explanatory diagram showing a frequency spectrum related to ANSam exclusion process, CED-tone generation and superposition for an ANSam signal. To be more specific, FIG. 29A shows a spectrum of the input signal and FIG. 29B shows a frequency spectrum after an ANSam exclusion process. FIG. 29C is a diagram showing a frequency spectrum after addition of a generated CED tone. With respect to an ANSam signal, the ANSam signal is subjected to an exclusion process as shown in FIG. 29B, and a CED signal having the same power as the 2100 Hz component of the input signal is added thereto as shown in FIG. 29C. Thus, to the fax sender, the CED signal is audible. In this way, since the fax sender is capable of confirming that the communication partner is a fax terminal, a fax message can be transmitted by carrying out manual operations.

The audio compression unit 144 shown in FIG. 10 carries out audio compression on an input signal in accordance with an audio compression method such as the ADPCM technique. The audio compression is accomplished by the DSP. The fax-termination/switching control unit 146 executes the following functions:
(i) Connect the switch 148 to the output of the audio compression unit 144 if the communication is not a G3 fax communication.
(ii) If the communication is a G3 fax communication, on the other hand, terminate the G3 fax communication and connect the switch 148 to the output of the fax-termination/switching control unit 146.

The audio decompression unit 150 decompresses a compressed audio signal. The fax-termination/switching control unit 152 executes the following functions:
(i) Connect the switch 154 to the output of the audio decompression unit 150 if the communication is not a G3 fax communication.
(ii) If the communication is a G3 fax communication, on the other hand, terminate the G3 fax communication and connect the switch 154 to the output of the fax-termination/switching control unit 152.

The communication processing unit 124 shown in FIG. 9 serves an interface between the audio interface card 122 and the relay line. For example, the communication processing unit 124 corresponds to the packet-distributing unit 80 shown in FIG. 6 or the multiplexing & demultiplexing unit 114 shown in FIG. 8.

Figure 30:
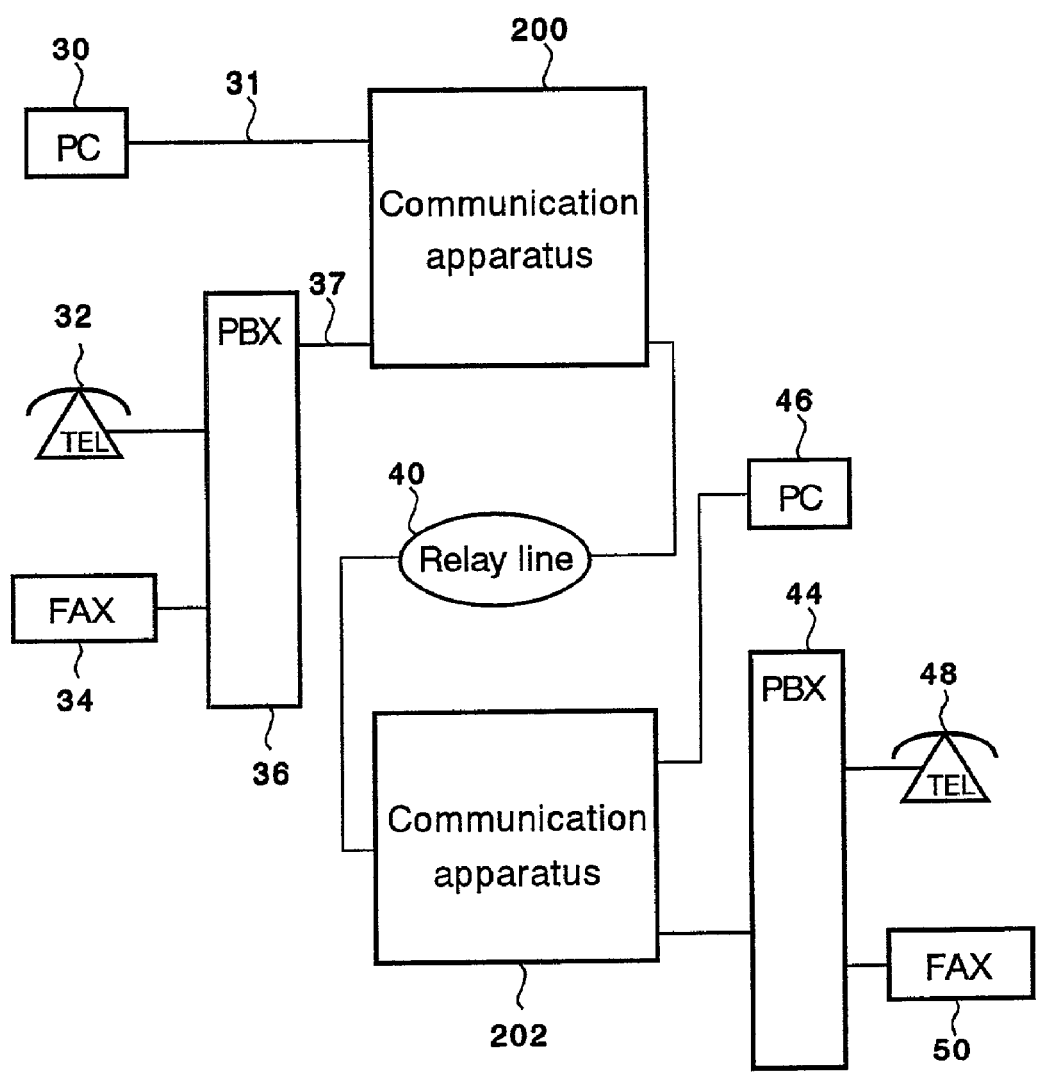
FIG. 30 is a diagram showing the configuration of a network system including communication apparatuses shown in FIG. 9.

FIG. 30 is a diagram showing the configuration of a network system including communication apparatuses 120 shown in FIG. 9. Elements of FIG. 30 virtually identical with those shown in FIG. 4 are denoted by the same reference numerals as the latter. Communication apparatuses 200 and 202 employed in the network system shown in FIG. 30 are each the communication apparatus 120 shown in FIG. 9. To put it in detail, when the negotiation control function is enabled and the super G3 fax terminals 34 and 50 accommodated in the network system each operate as a fax terminal on the called side, the communication apparatuses 200 and 202 each have functions to detect an ANSam signal transmitted by a fax terminal on the called side, put the detected ANSam signal in an exclusion process and superpose a CED tone having the same level as the 2100 Hz component of the input signal completing the exclusion process on the input signal.

Figure 31:
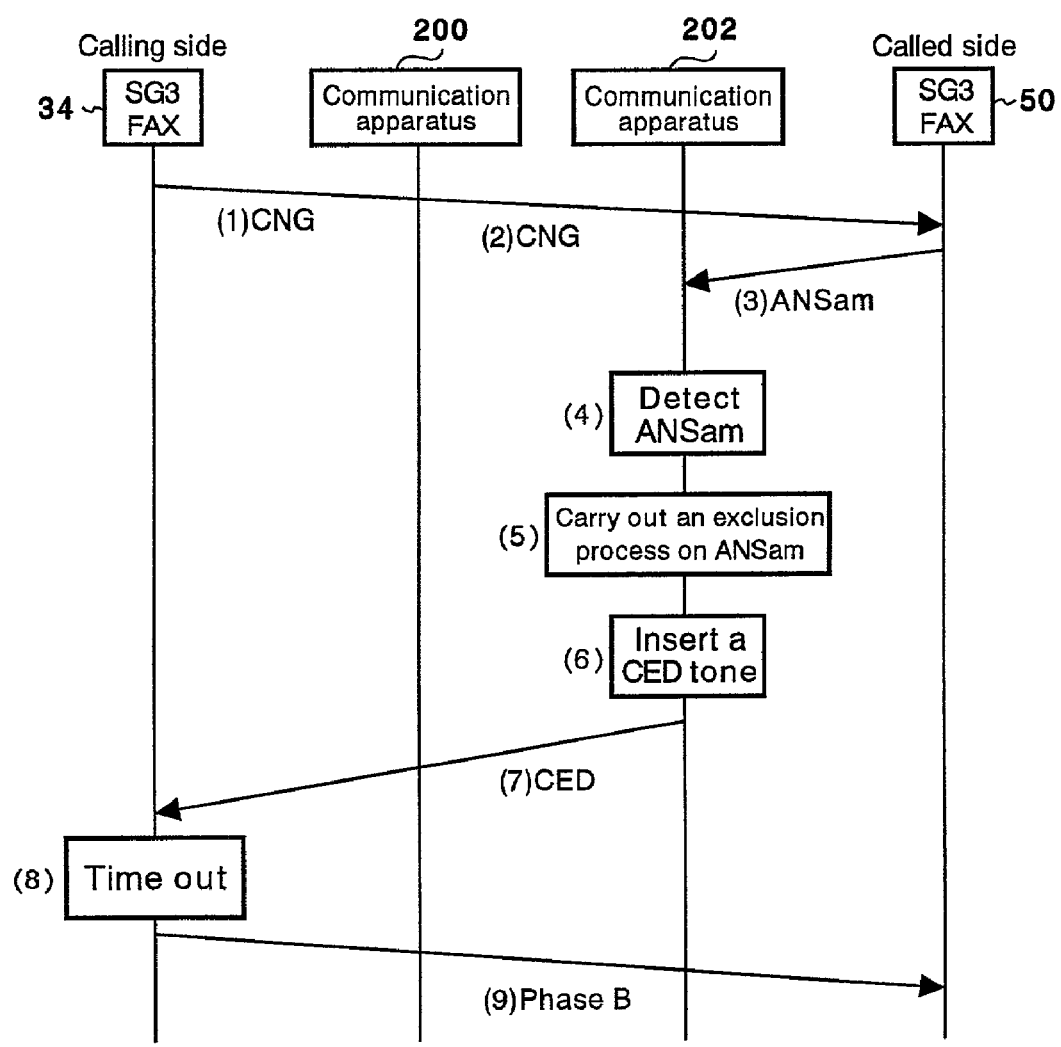
FIG. 31 is a communication-sequence chart.

FIG. 31 is a communication-sequence chart. The chart represents a sequence of communication between the terminal 34 serving as an SG3 fax (super G3 fax) terminal on the transmitting side and the terminal 50 serving as a super G3 fax terminal on the called side. The super G3 fax terminal 34 makes a call to the super G3 fax terminal 50. The super G3 fax terminal 34 on the calling side transmits a CNG signal denoted by reference numeral (1) to the super G3 fax terminal 50 on the called side. The CNG signal is a single tone with a frequency of 1,100 Hz for informing the super G3 fax terminal 50 that the super G3 fax terminal 34 is a fax terminal. Knowing that the CNG signal received from the super G3 fax terminal 34 on the calling side is not an ANSam signal including neither the component with a frequency of 1,100 Hz nor the component with a frequency of 15 Hz, the communication apparatus 200 carries out audio compression on the CNG signal. The communication apparatus 200 then transmits the CNG signal denoted by reference numeral (2) to the communication apparatus 202 through the relay line 40. The communication apparatus 202 carries out audio decompression on the CNG signal and then transmits the CNG signal completing the audio decompression to the super G3 fax terminal 50 on the called side. The super G3 fax terminal 50 on the called side does not detect the CNG signal. The super G3 fax terminal 50 on the called side transmits an ANSam signal denoted by reference numeral (3) to the super G3 fax terminal 34 on the calling side.

The communication apparatus 202 detects the ANSam signal in a process denoted by reference numeral (4) by adopting a method described earlier. In an exclusion process denoted by reference numeral (5), the communication apparatus 202 puts the ANSam signal. To put it concretely, the communication apparatus 202 removes the components with frequencies of 2,100 Hz and 15 Hz from the input signal, but passes on other components by adoption of a method described earlier. In a process denoted by reference numeral (6), the communication apparatus 202 superposes a CED tone having the same level as the 2100 Hz component included in the input signal on a signal obtained as a result of elimination the components with frequencies of 2,100 Hz and 15 Hz from the input signal by adoption of a method described earlier. The communication apparatus 202 then transmits a CED signal denoted by reference numeral (7) to the communication apparatus 200 through the relay line 40. The CED signal is a signal obtained as a result of audio compression of the signal superposed in the process (6). The communication apparatus 200 carries out audio decompression on the CED signal completing the audio compression in order to restore the CED tone which is then transmitted to the super G3 fax terminal 34 on the calling side. The CED tone is finally output to a speaker. The fax sender hears the sound generated by the speaker and confirms that the terminal serving as a communication partner is a fax terminal. Thus, the fax sender is capable of transmitting a fax message by carrying out manual operations. The super G3 fax terminal 34 on the calling side monitors reception of an ANSam signal during a predetermined period of time since the transmission of the CNG signal (1). Since the ANSam signal has been subjected to an exclusion process, however, the super G3 fax terminal 34 on the calling side is not capable of receiving the ANSam signal during the predetermined period of time, entering a time-out state denoted by reference numeral (8). In the time-out state, the super G3 fax terminal 34 on the calling side enters a standard G3 mode (phase B) as indicated by reference numeral (9). In the standard G3 mode, the fax-termination/switching control unit employed in each of the communication apparatus 200 and the communication apparatus 202 terminates fax communications, and executes switching control to prevent a signal from being passed through the audio compression unit 144 and the audio decompression unit 150. In this way, a G3 fax communication is established between the super G3 fax terminal 34 on the calling side and the super G3 fax terminal 50 on the called side. That is to say, a G3 fax communication can be carried out between the terminal 34 on the calling side and the terminal 50 on the called side even if the terminals are both a super G3 fax terminal.

Figure 32:
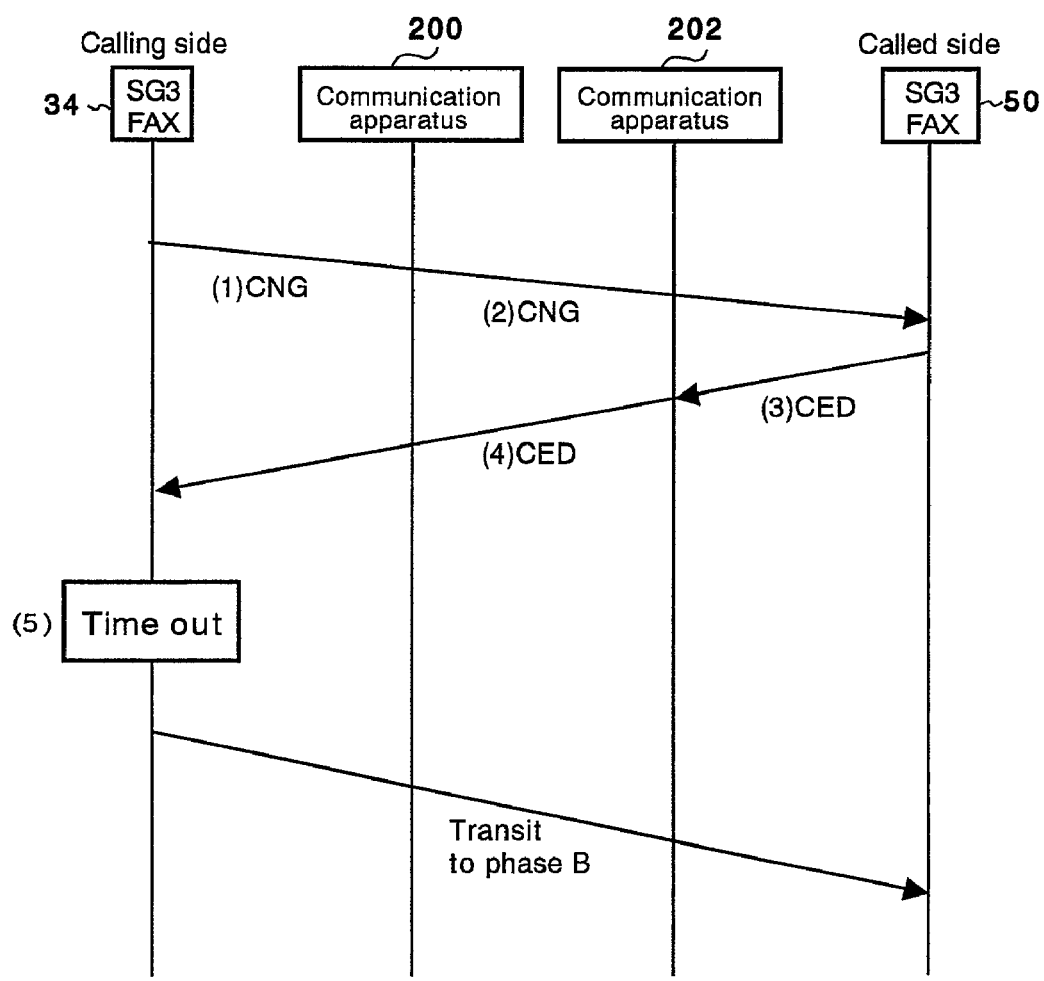
FIG. 32 is a communication-sequence chart.

FIG. 32 is another communication-sequence chart. Unlike the sequence shown in FIG. 31, the terminal 50 is a G3 fax terminal. Thus, the chart represents a sequence of communication between the terminal 34 serving as a super G3 fax terminal on the calling side and the terminal 50 serving as an G3 fax terminal on the called side. The super G3 fax terminal 34 on the calling side makes a call to the G3 fax terminal 50 on the called side. The transmissions of the signals (1) and (2) shown in FIG. 32 are the same as their counterparts shown in FIG. 31. The communication apparatus 202 carries out audio decompression on the received CNG signal. The CNG signal obtained as a result of the audio decompression is transmitted to the G3 fax terminal 50 on the called side. The G3 fax terminal 50 on the called side receives the CNG signal, but does not detect it. Since the terminal 50 on the called side is a G3 fax terminal and is not a super G3 fax terminal, the terminal 50 transmits a CED tone denoted by reference numeral (3) to the super G3 fax terminal 34 on the calling side by way of the communication apparatus 202. The CED tone is a 2100 Hz single tone completing no amplitude modulation at a frequency of 15 Hz. Thus, by using a method of detecting an ANSam signal, the CED tone may or may not be detected as ANSam signal. The CED tone may be recognized as ANSam signal if detection of the component having a frequency of 2,100 Hz is adopted as a method of detecting an ANSam signal. If detection of both the components having frequencies of 15 Hz and 2,100 Hz is adopted as a method of detecting an ANSam signal, on the other hand, the CED tone is recognized as an ANSam signal. If the CED tone is recognized as ANSam signal, the CED tone is subjected to an exclusion process. Since the level of the added CED itself does not change, however, the signal output by the communication apparatus 202 is virtually the same as the signal input thereby. That is why the output signal (4) is also denoted by the notation CED. If the CED tone is not recognized as ANSam signal, on the other hand, the CED tone is not subjected to an exclusion process. The CED tone is subjected to audio compression and transmitted to the communication apparatus 200 through the relay line 56. The communication apparatus 200 carries out audio decompression on the received CED tone completing the audio compression to restore the original CED tone which is then transmitted to the super G3 fax terminal 34 on the calling side.

The CED tone is finally output by the super G3 fax terminal 34 on the calling side to a speaker. The fax sender hears the sound generated by the speaker to confirm that the terminal serving as a communication partner is a fax terminal. Thus, the fax sender is capable of transmitting a fax message by carrying out manual operations. The super G3 fax terminal 34 on the calling side monitors reception of an ANSam signal during a predetermined period of time since the transmission of the CNG signal (1). Since the G3 fax terminal 50 on the called side is a G3 fax terminal transmitting no ANSam signal, however, the super G3 fax terminal 34 on the calling side does not receive the ANSam signal during the predetermined period of time, entering a time-out state denoted by reference numeral (5). In the time-out state, the super G3 fax terminal 34 on the calling side enters a standard G3 mode (phase B) as indicated by reference numeral (6). In the standard G3 mode, the fax-termination/switching control unit 146 employed in the communication apparatus 200 and the fax-termination/switching control unit 152 employed in the communication apparatus 202 terminate fax communications, and executes switching control to prevent a signal from being passed through the audio compression unit 144 and the audio decompression unit 150. In this way, a G3 fax communication is established between the super G3 fax terminal 34 on the calling side and the G3 fax terminal 50 on the called side. That is to say, a G3 fax communication can be carried out between the terminal 34 on the calling side and the terminal 50 on the called side even if the terminal 50 is a G3 fax terminal and the terminal 34 is a super G3 fax terminal.

If the terminal on the calling side is a G3 fax terminal while the terminal on the called side is a super G3 fax terminal, an ANSam signal transmitted by the fax terminal on the called side is subjected to an exclusion process in the communication apparatus 202 so that the fax terminal on the calling side does not recognize the ANSam signal. As a result, a G3 fax communication can be established between the G3 fax terminal 34 serving as a terminal on the calling side and the super G3 fax terminal 50 serving as a terminal on the called side with a high degree of reliability without an error. If the terminal 34 serving as a terminal on the calling side and the terminal 50 serving as a terminal on the called side are each a G3 fax terminal, essentially the same CED signal is added without regard to whether a G3-fax negotiation signal is passed on or blocked. As a result, a G3 fax communication can be established between the G3 fax terminal 34 serving as a terminal on the calling side and the G3 fax terminal 50 serving as a terminal on the called side.

In accordance with this embodiment described above, in an ATM data communication network, an IP data communication network or another digital-data communication network which supports audio communication assuming the use of an audio band compression function and utilizes technologies such as the VTOA, the VOIP and the VOFR, it is possible to switch a fax communication between super G3 fax terminals to an ordinary G3 fax procedure in order to establish a G3 fax communication with a high degree of reliability while maintaining a high audio quality and providing no sense of incompatibility in a manual operation performed to carry out a transmission. Now, that the number of super G3 fax terminals has been increasing, the embodiment makes it possible to keep up with super G3 fax communication very easily without incurring costs and without modifying the configuration of the network or the like so as to offer an extremely great effect.

Second Embodiment

Figure 33:
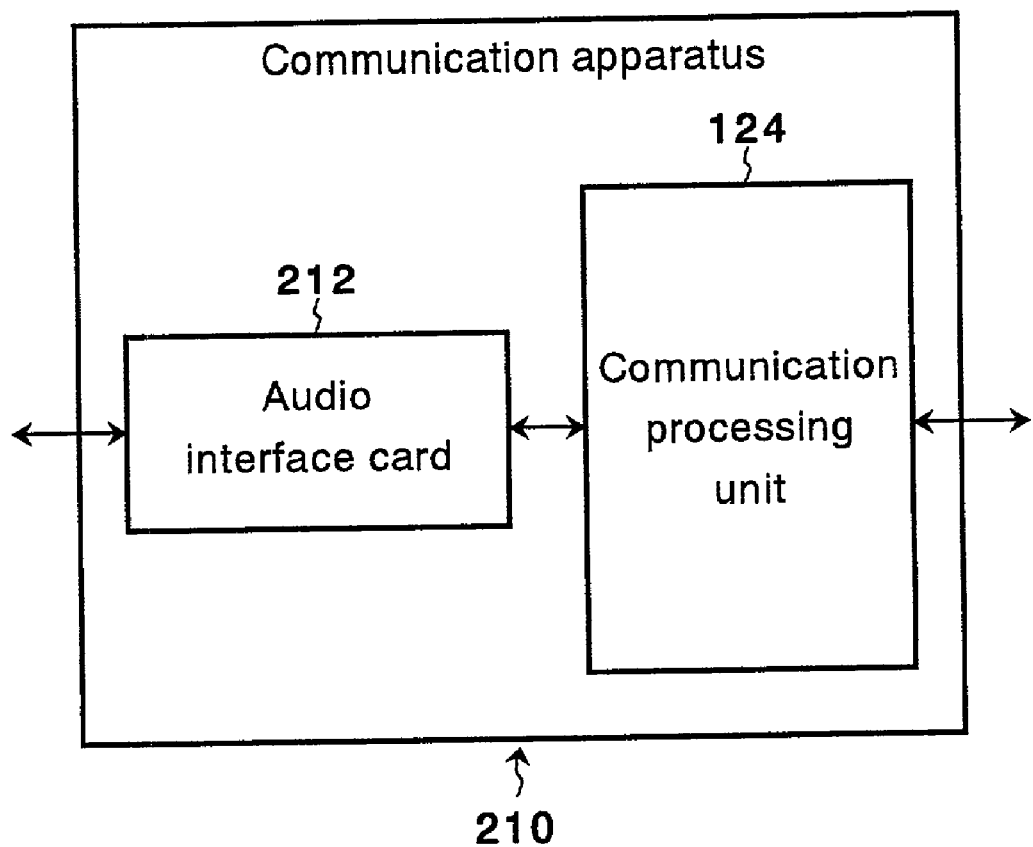
FIG. 33 is a diagram showing the configuration of a communication apparatus implemented by a second embodiment of the present invention.

FIG. 33 is a diagram showing the configuration of a communication apparatus 210 implemented by a second embodiment of the present invention. The second embodiment's elements virtually identical with those employed in the first embodiment shown in FIG. 9 are denoted by the same reference numerals as the latter. In the case of the first embodiment, communication apparatuses communicating with each other are each provided with a function to detect an ANSam signal and to carry out an exclusion process. Such a function is referred to hereafter as a present function. The present function of a communication apparatus is executed for a fax terminal connected to the communication apparatus. Thus, in the first embodiment, an ANSam signal is detected from an input signal and subjected to an exclusion process prior to audio compression at a stage in front of an audio compression unit in order to prevent the ANSam signal from reaching a fax terminal serving as a communication partner, that is, a super G3 fax terminal connected to a communication apparatus on the other side of the relay network. If both the communication apparatuses are provided with the present function, the present functions are each executed for a fax terminal connected to the communication apparatus no matter which super G3 fax terminal is used as a terminal on the calling side and no matter which super G3 fax terminal is used as a terminal on the called side so that an ANSam signal never passes through the relay network. If only one of the communication apparatuses is provided with the present function, on the other hand, the communication apparatus 210 having the present function must detect ANSam signals generated by super G3 fax terminals on the calling and called sides and carry out an exclusion process on the signals. For a super G3 fax terminal connected to the communication apparatus 210 having the present function, an ANSam signal is detected and subjected to an exclusion process in the same way as the first embodiment. In the first embodiment, an ANSam signal is detected from an input signal and subjected to an exclusion process prior to audio compression at a stage in front of an audio compression unit. On the other hand, a communication apparatus not provided with the present function for detecting an ANSam signal is not capable of carrying out an exclusion process on an ANSam signal and, hence, incapable of putting the ANSam signal in an exclusion state. Thus, if a fax terminal on the calling side is connected to the communication apparatus 210 having the present function and a fax terminal on the called side is connected to a communication apparatus not provided with the present function, the fax terminal on the called side connected to the communication apparatus not provided with the present function may transmit an ANSam signal not subjected to an exclusion process to the communication apparatus 210 having the present function by way of the relay network. In the communication apparatus 210 having the present function, an audio decompression unit detects an ANSam signal received from the relay network and carries out an exclusion process on the signal after decompression.

Figure 34:
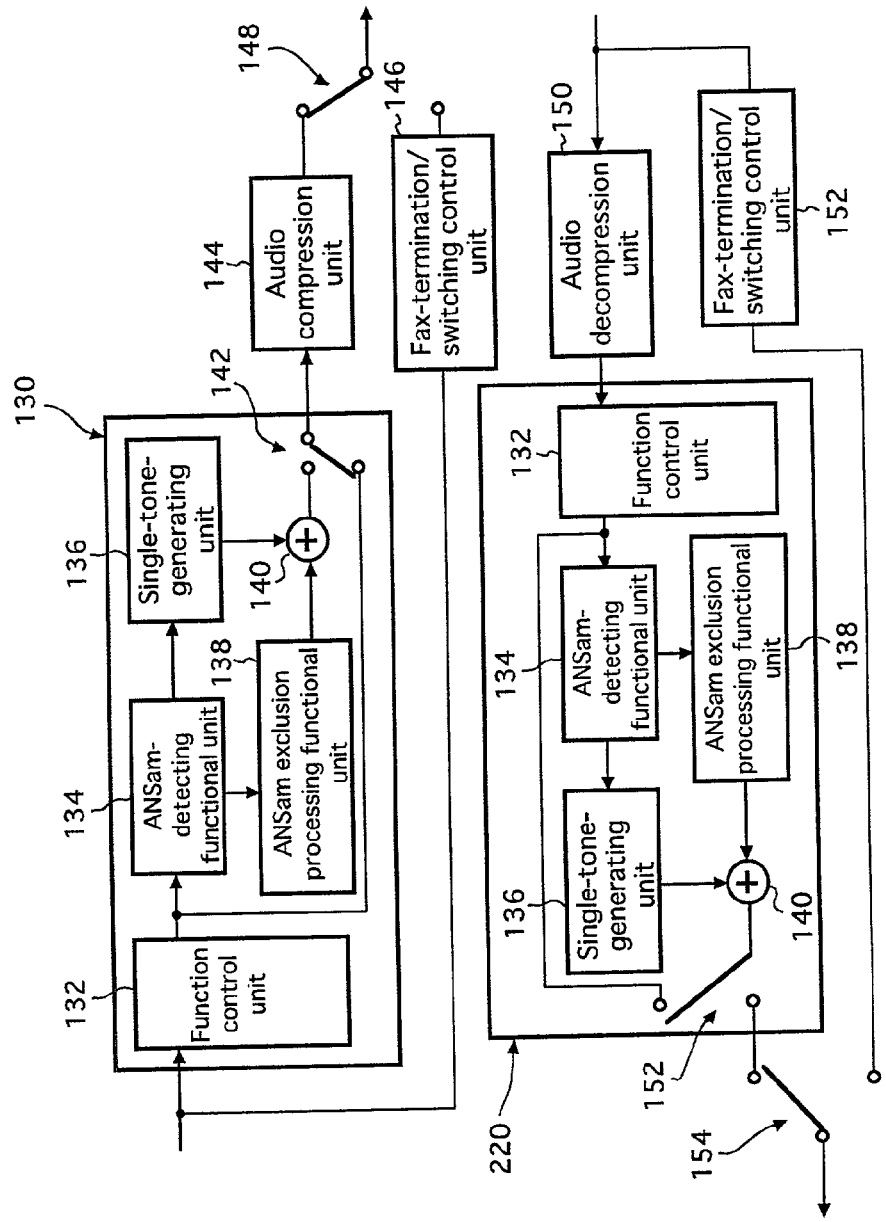
FIG. 34 is a diagram showing an audio compression/decompression functional unit and a fax-termination/switching control unit, which are employed in an audio interface card of the communication apparatus shown in FIG. 33.
Figure 35:
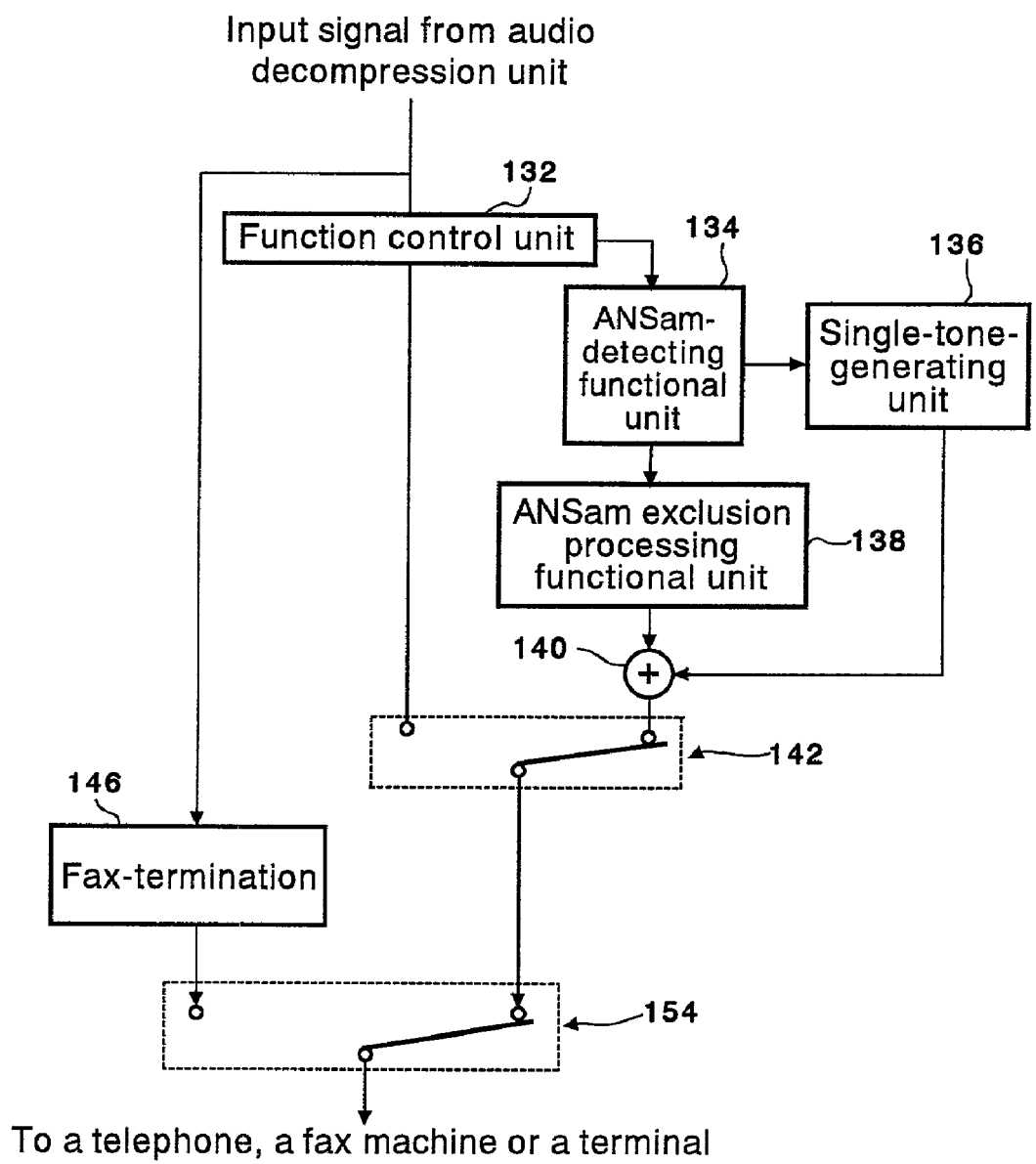
FIG. 35 is a block diagram showing details of a post-decompression ANSam exclusion processing block.

FIG. 34 is a diagram showing an audio compression/decompression functional unit and a fax-termination/switching control unit, which are employed in the audio interface card 212 of the communication apparatus shown in FIG. 33. Elements of the audio interface card 212 virtually identical with those shown in FIG. 10 are denoted by the same reference numerals as the latter. As shown in FIG. 34, the audio interface card 212 additionally includes a post-audio-decompression-ANSam exclusion processing block 220 for detecting an ANSam signal and carrying out an exclusion process on the signal after decompression carried out by the audio decompression unit 150. FIG. 35 is a block diagram showing details of the post-audio-decompression-ANSam exclusion processing block 220. Elements of the post-audio-decompression-ANSam exclusion processing block 220 virtually identical with those shown in FIG. 12 are denoted by the same reference numerals as the latter. As shown in FIG. 35, the post-audio-decompression-ANSam exclusion processing block 220 inputs a signal completing audio decompression from the audio decompression unit 150 and outputs a signal to a telephone set, a fax machine or a terminal as opposed to the pre-audio-compression exclusion processing block 130 which inputs a signal, which has not been subjected to audio compression, from a telephone set, a fax machine or a terminal, and outputs a signal to the audio compression unit 144. However, the processing carried out by the post-audio-decompression-ANSam exclusion processing block 220 is the same as the pre-audio-compression exclusion processing block 130.

Figure 36:
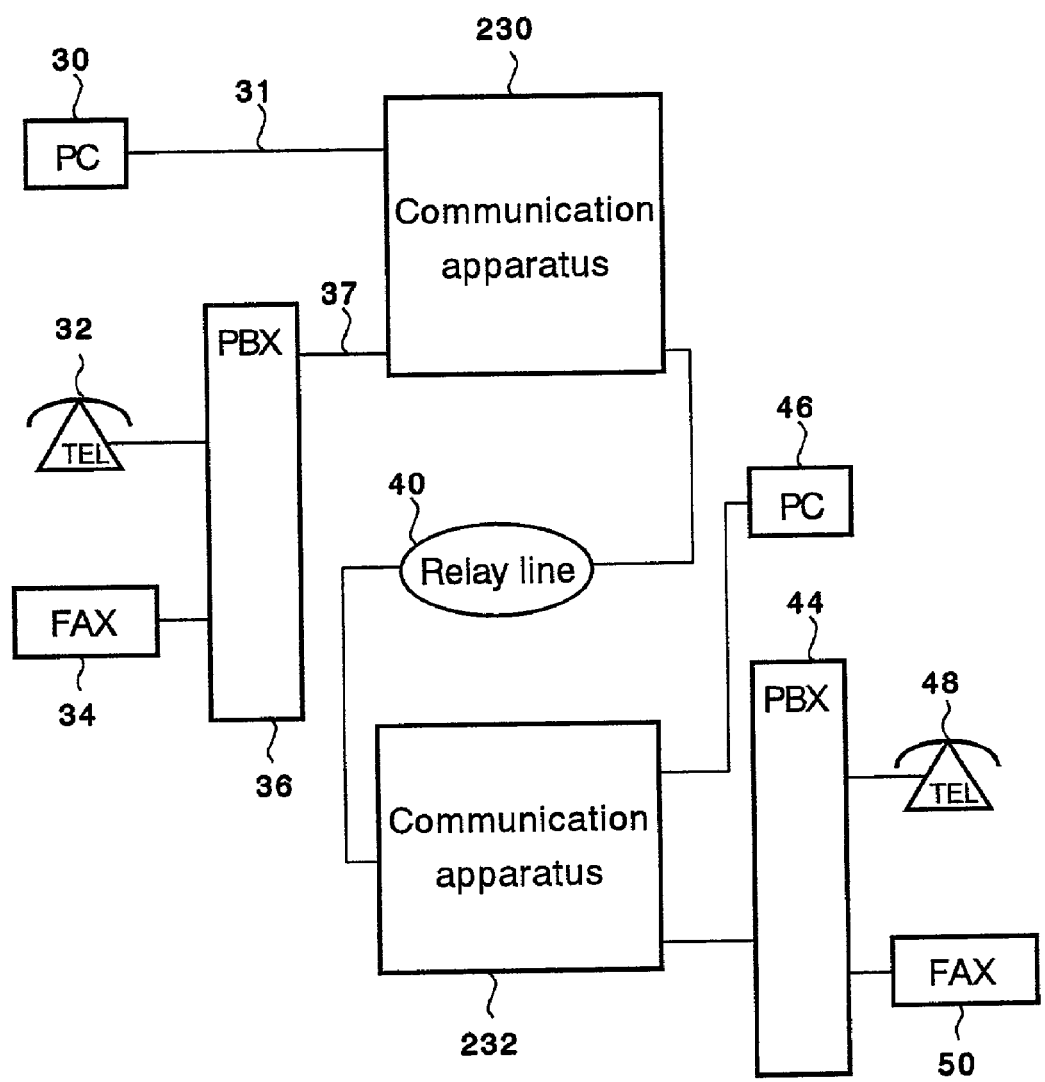
FIG. 36 is a diagram showing the configuration of a network system including the communication apparatus shown in FIG. 33.

FIG. 36 is a diagram showing the configuration of a network system including the communication apparatus 210 shown in FIG. 33 as a communication apparatus 230. A communication apparatus 232 employed in the network system shown in FIG. 36 is the conventional communication apparatus not provided with the present function.

Figure 37:
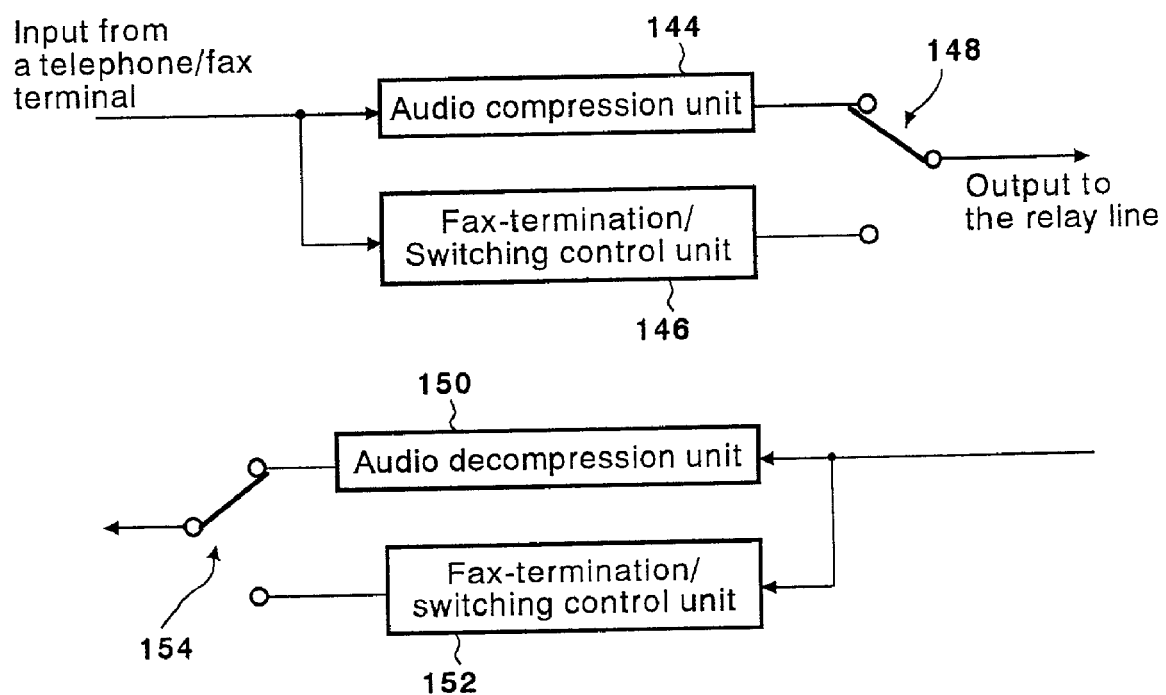
FIG. 37 is a diagram showing an audio compression/decompression functional unit and a fax-termination/switching control unit, which are employed in the communication apparatus included in the network system shown in FIG. 36.

FIG. 37 is a diagram showing an audio compression/decompression functional unit and a fax-termination/switching control unit, which are employed in the communication apparatus 232 included in the network system shown in FIG. 36. Elements of the communication apparatus 232 virtually identical with those shown in FIG. 10 are denoted by the same reference numerals as the latter.

Figure 38:
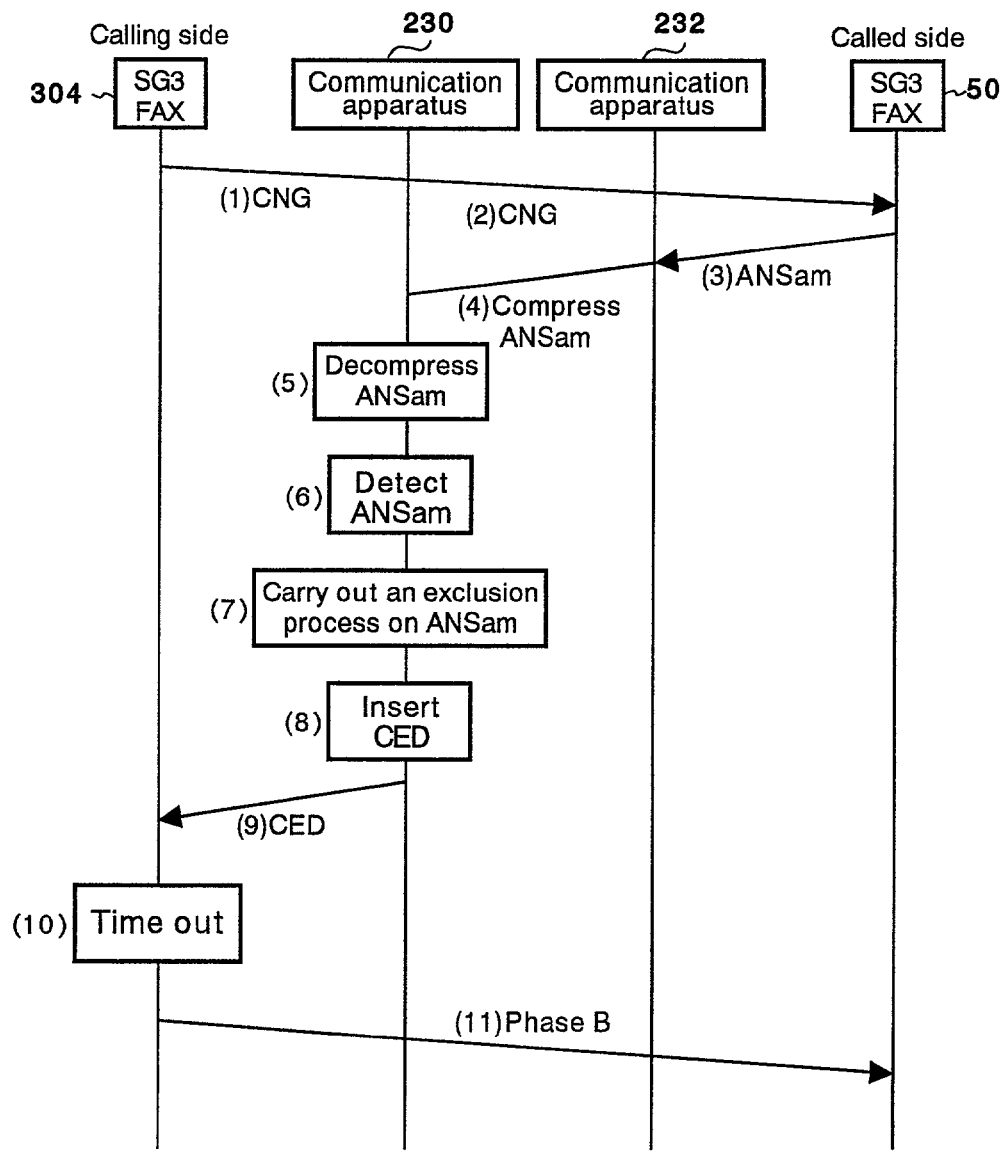
FIG. 38 is a communication sequence chart.

FIG. 38 is a communication sequence chart. The chart of FIG. 38 represents a sequence of communication between a fax terminal 34 connected to the communication apparatus 230 and used as a super G3 fax terminal on the calling side and a terminal 50 connected to the communication apparatus 232 and used as a super G3 fax terminal on the called side in the network system shown in FIG. 36. The transmissions of the signals (1), (2) and (3) shown in FIG. 38 are the same as their counterparts shown in FIG. 31. When an ANSam signal is received from the super G3 fax terminal 50 on the called side by the communication apparatus 232 provided with no function to detect the ANSam signal and carry out an exclusion process on the signal, the signal is subjected to audio compression, and a compression result denoted by reference numeral (4) is transmitted to the communication apparatus 230 through the relay network 40. In the communication apparatus 230, the audio decompression unit 150 carries out decompression denoted by reference numeral (5) on the compressed ANSam signal. After the decompression, the post-audio-decompression-ANSam exclusion processing block 220 carries out the following pieces of processing. First of all, the decompressed ANSam signal is detected in the processing denoted by reference numeral (6). Then, the detected ANSam signal is subjected to an exclusion process denoted by reference numeral (7). Finally, a CED tone is added to the signal in the processing denoted by reference numeral (8). The CED tone denoted by reference numeral (9) is output by the communication apparatus 230 and transmitted to the super G3 fax terminal 34 on the calling side. Since the ANSam signal has been subjected to an exclusion process, however, the super G3 fax terminal 34 on the calling side is not capable of receiving the ANSam signal during a predetermined period of time, entering a time-out state denoted by reference numeral (10). In the time-out state, the super G3 fax terminal 34 on the calling side enters a standard G3 mode (phase B) as indicated by reference numeral (11). In the standard G3 mode, the fax-termination/switching control unit employed in each of the communication apparatus 230 and the communication apparatus 232 terminates fax communications, and executes switching control to prevent a signal from being passed through the audio compression unit 144 and the audio decompression unit 150. In this way, a G3 fax communication is established between the super G3 fax terminal 34 on the calling side and the super G3 fax terminal 50 on the called side. That is to say, a G3 fax communication can be carried out between the terminal 34 on the calling side and the terminal 50 on the called side even if the terminals are both a super G3 fax terminal. When the super G3 fax terminal 34 serves as a terminal on the called side and the super G3 fax terminal 50 serves as a terminal on the calling side, on the other hand, the same sequence as that shown in FIG. 31 is accomplished.

In accordance with the embodiment described above, it is possible to provide the same effect as the first embodiment. In addition, even if one of the communication apparatuses does not have the function to detect an ANSam signal and carry out an exclusion process on the signal, the other communication apparatus detects an ASNam signal before audio compression or after audio decompression and carries out an exclusion process on the detected signal. As a result, a G3 fax communication can be established between a super G3 fax terminal and a G3 fax terminal 50. Also in accordance with this embodiment described above, it is possible to switch a fax communication between super G3 fax terminals to an ordinary G3 fax procedure in order to establish a G3 fax communication with a high degree of reliability while maintaining a high audio quality and providing no sense of incompatibility in a manual operation performed to carry out a transmission.

It should be noted that the present invention is not limited to the details of the preferred embodiments described above. Instead, the scope of the present invention is defined by appended claims and all changes and modifications falling within the equivalence of the scope of the claims are therefore to be embraced by the invention.

What is claimed is:

1. A communication apparatus comprising:
    an audio compression unit for compressing an audio signal and outputting said compressed audio signal;
    a fax-termination/switching control unit which carries out termination processing on a fax signal and controls a switch to output not an output at said audio compression but said fax signal completing said termination processing when said fax signal is detected; and
    an exclusion processing unit which is provided in front of said audio compression unit and blocks transmission of a raw negotiation signal to said audio compression unit in an exclusion process when detecting said negotiation signal, thereby the blocked negotiation signal being unrecognizable as said negotiation signal to a receiver fax terminal, wherein
    said negotiation signal is transmitted by an accommodating fax terminal prior to a fax data communication,
    a fax communication is performed based on a first fax communication protocol when said negotiation signal is recognized by a receiver fax terminal, and
    a fax communication is performed based on a second fax communication protocol when said negotiation signal is not recognized by a receiver fax terminal.

2. A communication apparatus according to claim 1, wherein said exclusion processing unit removes only a signal component with a frequency of said negotiation signal from an input signal and passes on components with other frequencies.

3. A communication apparatus according to claim 1, said communication apparatus further comprising:
    a single-tone-generating unit for generating a single tone with a fixed frequency indicating a fax terminal upon detection of said negotiation signal; and
    a synthesis unit for adding said signal completing said exclusion process carried out in said exclusion processing unit.

4. A communication apparatus according to claim 3, wherein said single-tone-generating unit generates said single tone at the same level as a component with a predetermined frequency of said input signal.

5. A communication apparatus according to claim 1, wherein;
    said negotiation signal is a signal completing amplitude modulation;
    said fax-termination/switching control unit includes a detection unit for detecting said negotiation signal within one period of an amplitude-modulation component; and
    said exclusion processing unit carries out an exclusion process on said input signal after said detection unit detects said negotiation signal.

6. A communication apparatus according to claim 5, wherein said detection unit confirms existence of said negotiation signal at a point of time said negotiation signal's component having a predetermined frequency is detected continuously during a period of post-detection protection and said amplitude-modulation component is detected.

7. A communication apparatus according to claim 5, wherein said detection unit confirms non-existence of said negotiation signal when said negotiation signal's component having a predetermined frequency is undetected continuously during a period of pre-extinction protection.

8. A communication apparatus according to claim 7, wherein said detection unit confirms non-existence of said negotiation signal when said negotiation signal's component having a predetermined frequency is undetected at at least a predetermined rate of non-detection during a period of pre-ex-extinction protection.

9. A communication method performing steps of:
    a step carrying out an exclusion process on a negotiation signal when said negotiation signal is detected, thereby a blocked negotiation signal being unrecognizable as said negotiation signal to a receiver fax terminal;
    a step compressing said negotiation signal carried out by said exclusion process as an audio signal and outputting said compressed negotiation signal through a switch; and
    a step carrying out termination processing on a fax signal except said negotiation signal and outputting said fax signal completing said termination processing through said switch when said fax signal is derected, wherein
    said negotiation signal is transmitted by an accommodating fax terminal prior to a fax data communication,
    a fax communication is performed based on a first fax communication protocol when said negotiation signal is recognized by a receiver fax terminal, and
    a fax communication is performed based on a second fax communication protocol when said negotiation signal is not recognized by a receiver fax terminal.

* * * * *